(12) United States Patent
Albouze

(10) Patent No.: US 10,672,167 B2
(45) Date of Patent: Jun. 2, 2020

(54) GENERATING SYNTHETIC GROUP SELFIES

(71) Applicant: Apple Inc., Cupertino, CA (US)

(72) Inventor: Jean-Francois M Albouze, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/033,135

(22) Filed: Jul. 11, 2018

(65) Prior Publication Data

US 2019/0102924 A1 Apr. 4, 2019

Related U.S. Application Data

(60) Provisional application No. 62/565,362, filed on Sep. 29, 2017.

(51) Int. Cl.

| G06T 11/60 | (2006.01) |
|---|---|
| H04N 5/262 | (2006.01) |
| H04N 1/387 | (2006.01) |
| H04N 5/272 | (2006.01) |
| H04N 7/14 | (2006.01) |
| H04N 7/15 | (2006.01) |

(52) U.S. Cl.
CPC ............. *G06T 11/60* (2013.01); *H04N 1/387* (2013.01); *H04N 5/2621* (2013.01); *H04N 5/272* (2013.01); *H04N 7/144* (2013.01); *H04N 7/147* (2013.01); *H04N 7/15* (2013.01)

(58) Field of Classification Search
CPC ............................... G06T 11/60; H04N 5/272
See application file for complete search history.

(56) References Cited

U.S. PATENT DOCUMENTS

| 2016/0057363 A1* | 2/2016 | Posa ..................... H04N 5/272 348/239 |
|---|---|---|
| 2016/0093020 A1 | 3/2016 | Basalamah et al. |
| 2016/0094651 A1* | 3/2016 | Basalamah ............ G06T 11/60 709/204 |
| 2016/0156874 A1 | 6/2016 | Rajagopalan et al. |
| 2018/0089746 A1* | 3/2018 | Cooke ................ G06Q 30/0635 |
| 2019/0037135 A1* | 1/2019 | Hedge ................ H04N 5/23229 |

* cited by examiner

*Primary Examiner* — Ryan R Yang
(74) *Attorney, Agent, or Firm* — Invoke

(57) ABSTRACT

In some implementations, a computing device can generate a synthetic group selfie. For example, a synthetic group selfie can be an arrangement or composition of individual selfies obtained from a plurality of computing devices into a single group image (e.g., synthetic group selfie). The individual selfie images can be still images, stored video images, or live streaming images. Thus, the synthetic group selfie can be a composition of still images, stored video images, or live streaming video images. The computing device can automatically arrange the individual selfies into the synthetic group selfie. The synthetic group selfie can be stored as a multi-resource object that preserves the individual selfie images so that the user who created the synthetic group selfie or a recipient of the synthetic group selfie can modify the arrangement of the individual selfies within the synthetic group selfie.

24 Claims, 15 Drawing Sheets

GENERATING SYNTHETIC GROUP SELFIES

TECHNICAL FIELD

The disclosure generally relates to digital photography.

BACKGROUND

Selfies (e.g. a self-image) are a popular way to capture or memorialize an event or moment. For example, a selfie can be defined as an image that a user of an image capturing device (e.g., a camera) captures using the image capturing device where the subject of the image is the user. Typically, when taking or capturing a self-image, the user holds a computing device (e.g., smartphone, tablet computer, etc.) having a forward facing image sensor in close proximity to the user by holding the computing device at arm's length to capture an image of the user with the forward facing image sensor. In some cases, the user will use a device (e.g., a selfie stick) to extend the range of the user's arm so that the forward facing image capturing sensor can capture a wider image.

An individual selfie can, for example, be an image captured by a user of an image capturing device where the subject captured in the image is the user. When a user wishes to memorialize an event with friends, the user can capture a group selfie where the self-image includes the user and the user's friends. While capturing an individual selfie can be accomplished easily since only the user needs to be placed within the field of view of the image capturing device, capturing a group selfie can be much more difficult since the user must arrange the user and the user's friends within the field of view of the image capture device when capturing the group selfie. Thus, an easier mechanism for capturing a group selfie would be advantageous.

SUMMARY

In some implementations, a computing device can generate a synthetic group selfie. For example, a synthetic group selfie can be an arrangement or composition of individual selfies obtained from a plurality of computing devices into a single group image (e.g., synthetic group selfie). The individual selfie images can be still images, stored video images, or live streaming images. Thus, the synthetic group selfie can be a composition of still images, stored video images, or live streaming video images. The computing device can automatically arrange the individual selfies into the synthetic group selfie. The synthetic group selfie can be stored as a multi-resource object that preserves the individual selfie images so that the user who created the synthetic group selfie or a recipient of the synthetic group selfie can modify the arrangement of the individual selfies within the synthetic group selfie.

Particular implementations provide at least the following advantages. Group selfies can be easily generated without having to organize or arrange people around a camera. The processing of individual selfies to remove background portions of individual selfie images can be distributed amongst multiple devices to reduce the amount of processing required to be performed by an individual device. Individual selfies can be automatically and intelligently arranged within the synthetic group selfie so that the user is not required to arrange individual selfies within the synthetic group selfie.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
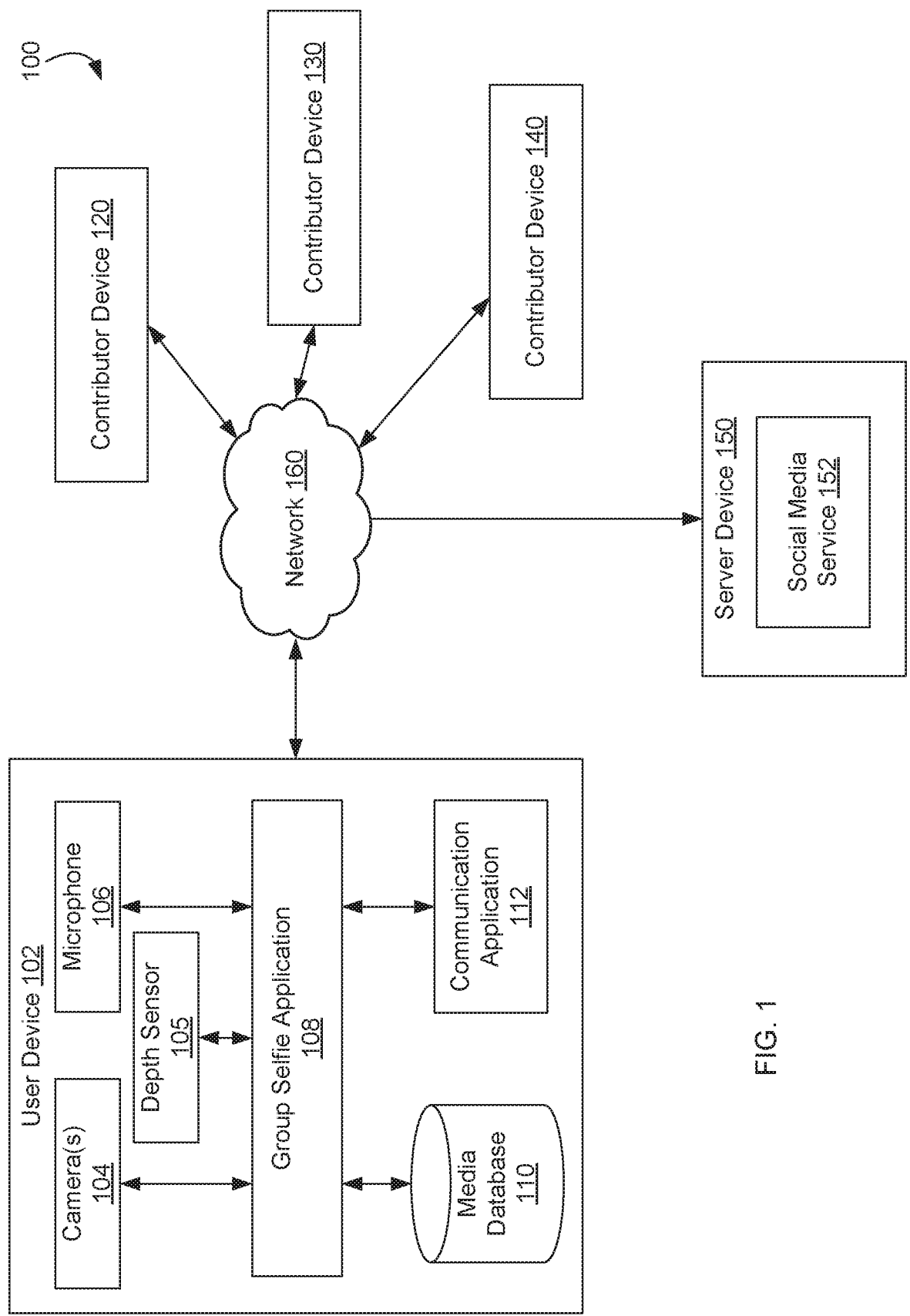
FIG. 1 is a block diagram of an example system for generating synthetic group selfies.

FIG. 1 is a block diagram of an example system 100 for generating synthetic group selfies. For example, a synthetic group selfie can be an arrangement or composition of individual selfies obtained from a plurality of computing devices into a single group image (e.g., synthetic group selfie).

A selfie can be defined as an image that a user of an image capturing device (e.g., a camera) captures using the image capturing device where the subject of the image is the user. Typically, when taking or capturing a selfie, the user holds a computing device (e.g., smartphone, tablet computer, etc.) having a forward facing image sensor in close proximity to the user by holding the computing device at arm's length to capture an image of the user with the forward facing image sensor. In some cases, the user will use a device (e.g., a selfie stick) to extend the range of the user's arm so that the forward facing image capturing sensor can capture a wider image. The selfie is often of the user's face or a portion of the user's body (e.g., upper body) and any background visible behind the user.

A forward facing image sensor (e.g., camera) can correspond to an image sensor located on the same side of the computing device as the display of the computing device. Thus, a forward facing image sensor can capture an image of the user while the user is viewing the display of the computing device. By way of comparison, a rearward facing image sensor can correspond to an image sensor located on the back side of the computing device and/or display such that the rearward facing image sensor cannot capture an image of the user while the user is viewing the display of the computing device. For example, a smartphone can have a display on one side (e.g., the front) of the smartphone and no display on the other, opposite side (e.g., the back) of the smartphone. However, the smartphone may include one or more forward facing image sensors on the front of the smartphone and one or more rearward facing images sensor on the back of the smartphone. The forward facing image sensors may be employed by the user to capture a selfie while viewing the display of the smartphone so that the user can use the display to view and frame the captured image before it is persistently stored on the smartphone.

In some implementations, system 100 can include user device 102. User device 102 can be a computing device, such as a smartphone, tablet computer, smart glasses, smartwatch, or any other type of computing device. For example, user device 102 could be a handheld computing device (e.g., a smartphone, tablet computer, etc.) having one or more forward facing and/or rearward facing imaging sensors (e.g., camera(s) 104).

Cameras 104 can capture still images, stored video images, and/or live streaming video images. Each of these types of images (e.g., still images, stored video images, live streaming video images, etc.) can be used to generate the synthetic group selfies described herein. However, to improve the readability of the description of the technology described herein, the paragraphs that follow my simply refer to "images," "selfies," "individual selfies," "group selfies," etc. The terms "images," "selfies," "individual selfies," "group selfies," etc., can correspond to still images, stored video images, live streaming video images, or a combination thereof. Thus, a synthetic group selfie can be include still images, stored video images, live streaming video images, or a combination thereof.

In some implementations, user device 102 can generate depth data for images captured by cameras 104. For example, user device can calculate depth data representing the distance between cameras 104 and objects captured in an image. The depth data (e.g., distance) can be calculated per image pixel and can be stored as metadata for the images captured by cameras 104. Thus, when an image editing application processes the image, the image processing application can distinguish between foreground objects that are nearer cameras 104 and background objects that are farther away from cameras 104. Different technologies can be implemented on user device 102 to capture or generate depth information for captured images. For example, user device 102 can calculate depth data for each pixel in a captured image based on the distance between corresponding points (e.g., pixels) on the image planes of two different cameras 104 in a stereo-rectified camera system. As another example, user device 102 can include depth sensor 105. Depth sensor 105 can, for example, include a laser ranging system (e.g., LIDAR, laser range finder, etc.) that can calculate the distance between user device 102 (e.g., cameras 104) and an object captured by camera 104.

In some implementations, user device 102 can include microphone 106. For example, when capturing images (e.g., still images, stored video images, live video images, etc.), user device 102 can capture audio data using microphone 106. The audio data can be stored with the captured images so that when the images are later presented, the audio data can be presented along with the captured images. For example, when video images are transmitted between user devices, the audio data can be transferred along with the video images so that the audio data (e.g., sound, music, voices, etc.) can be presented with the video images using well-known technologies.

In some implementations, user device 102 can include group selfie application 108. For example, group selfie application 108 can be a standalone application for generating synthetic group selfies, as described herein. Group selfie application 108 can be an application that includes the synthetic group selfie technologies described herein. For example, group selfie application 108 can be a messaging application (e.g., text message application, instant message application, email application, etc.) used to distribute text and/or media (e.g., synthetic group selfies, individual selfies, etc.) to other user devices. Group selfie application 108 can be a social media application that can be used by the user of user device 102 to upload and distribute synthetic group selfies through social media service 152 running on server device 150. Group selfie application 108 can interact with cameras 104, depth sensor 105, and/or microphone 106 to capture selfies (e.g., self-images, individual selfies, etc.) and/or background images that can be included in a synthetic group selfie.

In some implementations, user device 102 can include media database 110. For example, media database 110 can store media (e.g., still images, video images, individual selfies, background images, etc.) and media metadata (e.g., image location information, image depth data, etc.) captured and/or received by user device 102. For example, when group selfie application 108 uses cameras 104, depth sensor 105, and/or microphone 106 to capture images, audio data, and/or image metadata, group selfie application 108 can store the images, audio data, and/or image metadata in media database 110. Similarly, when group selfie application 108 receives images, audio data, and/or image metadata (e.g., corresponding to individual selfies) received from other user devices (e.g., contributor devices 120, 130, 140, etc.), group selfie application 108 can store the received images, audio data, and/or image metadata in media database 110.

In some implementations, user device 108 can include communication application 112. For example, communication application 112 can be a messaging application (e.g., text message application, instant message application, email application, etc.) used to distribute text and/or media (e.g., synthetic group selfies, individual selfies, etc.) to other user devices. Communication application 112 can be a social media application that can be used by the user of user device 102 to upload and distribute synthetic group selfies through social media service 152 running on server device 150.

In some implementations, system 100 can include contributor devices 120, 130, and/or 140. For example, contributor devices 120, 130, and/or 140 can be other user devices that are configures similarly, or in some cases identically, to user device 102. Thus, contributor devices 120, 130, and/or 140 can capture images, depth data, and/or audio data and store the images, depth data, and/or audio data in a local media database and/or share the images, depth data, and/or audio data with other user devices using a communication application similar to user device 102. Contributor devices 120, 130, and/or 140 can include a group selfie application (similar to group selfie application 108)

that can generate synthetic group selfies and/or capture and transmit individual selfies, as described herein.

In some implementations, system 100 can include network 150. For example, network 150 can correspond to a local area network, wide area network, the Internet, a direct peer-to-peer network (e.g., device to device Wi-Fi, Bluetooth, etc.), and/or an indirect peer-to-peer network (e.g., devices communicating through a server, router, or other network device). Network 150 can represent a single network or multiple networks. For example, user device 102 and contributor device 120 may communicate through a direct peer-to-peer network while user device 102 and server device 150 may communicate through the Internet. The communication network used by the various devices of system 100 may be selected based on the proximity of the devices to one another or some other factor. For example, when user device 102 and contributor device 130 are near each other (e.g., within a threshold distance, within direct communication range, etc.), user device 102 and contributor device 130 may exchange data (e.g., individual selfies, background images, synthetic group selfies, etc.) using a direct peer-to-peer network. However, when user device 102 and contributor device 130 are not near each other, user device 102 and contributor device 130 may exchange data (e.g., individual selfies, background images, synthetic group selfies, etc.) using an peer-to-peer network (e.g., the Internet).

Figure 2:
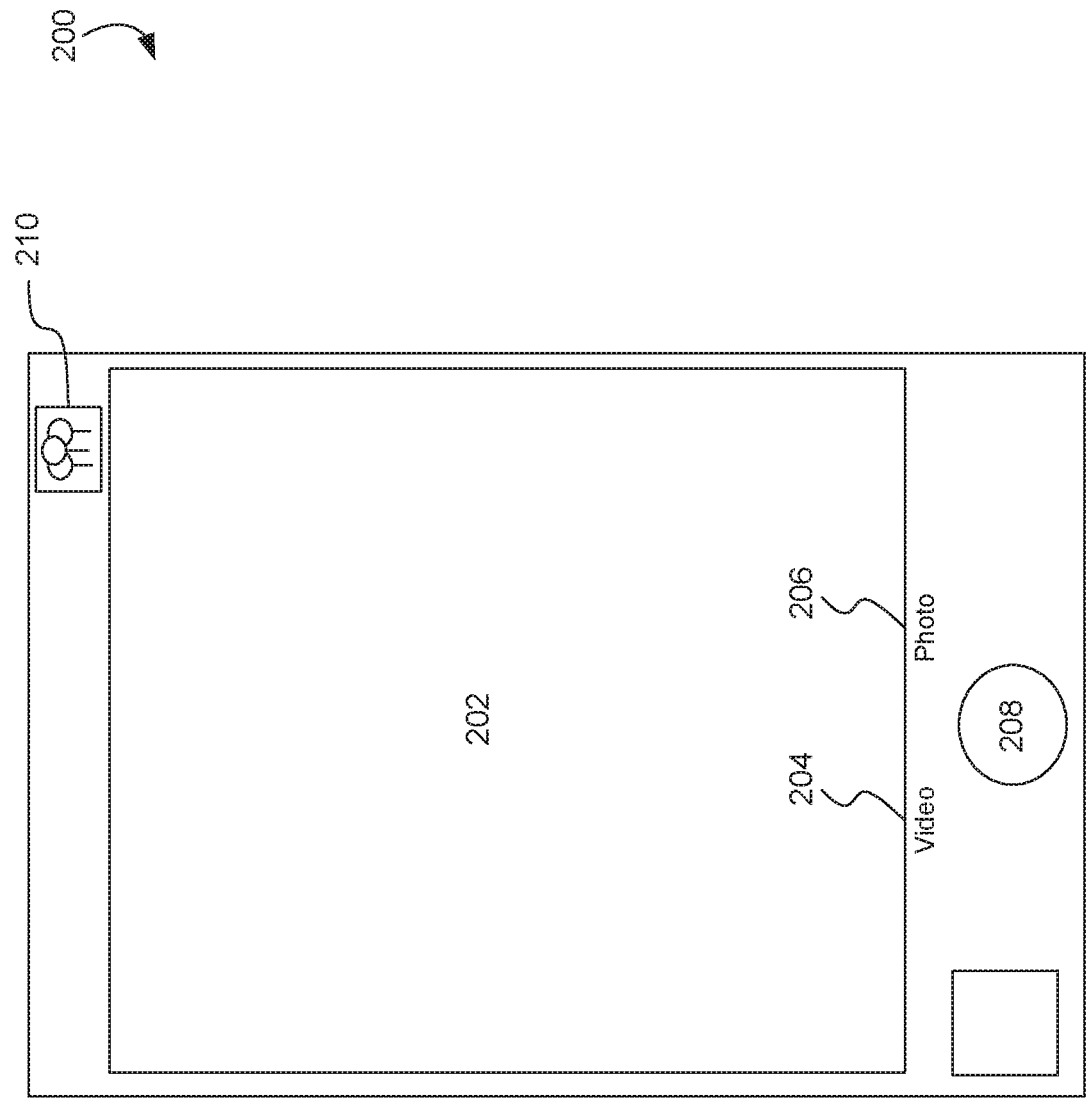
FIG. 2 illustrates an example graphical user interface for initiating a synthetic group selfie.

FIG. 2 illustrates an example graphical user interface 200 for initiating a synthetic group selfie. For example, graphical user interface (GUI) 200 can be a GUI presented by group selfie application 108 on a display of user device 102. In some implementations, GUI 200 can be presented when group selfie application 108 is invoked on user device 102 by a user of user device 102.

In some implementations, GUI 200 can present graphical user interface elements for capturing images using cameras 104. For example, GUI 200 can include image area 202 that presents a preview of an image to be captured by cameras 104 on user device 102. Image area 202 can act similarly to a view finder of an analog camera that allows the user to frame an image to be captured. Cameras 104 can, for example, provide a live feed of the images that camera 104 is receiving and present the live feed in image area 202 so that the user can capture and/or store an image using cameras 104.

GUI 200 can include image type selectors 204 and/or 206. For example, the user can select graphical element 204 to indicate that user device 102 should capture and/or store video images. The user can select graphical element 206 to indicate that user device 102 should capture still photos. When the user is ready to capture the video or still image, the user can select graphical element 208 to capture the still image or initiate recording the video images.

In some implementations, GUI 200 can include graphical element 210 for initiating a synthetic group selfie mode of group selfie application 108. For example, in response to receiving a user selection of graphical element 210, group selfie application 108 can enter a group selfie mode and present one or more graphical user interfaces for creating a synthetic group selfie.

Figure 3A:
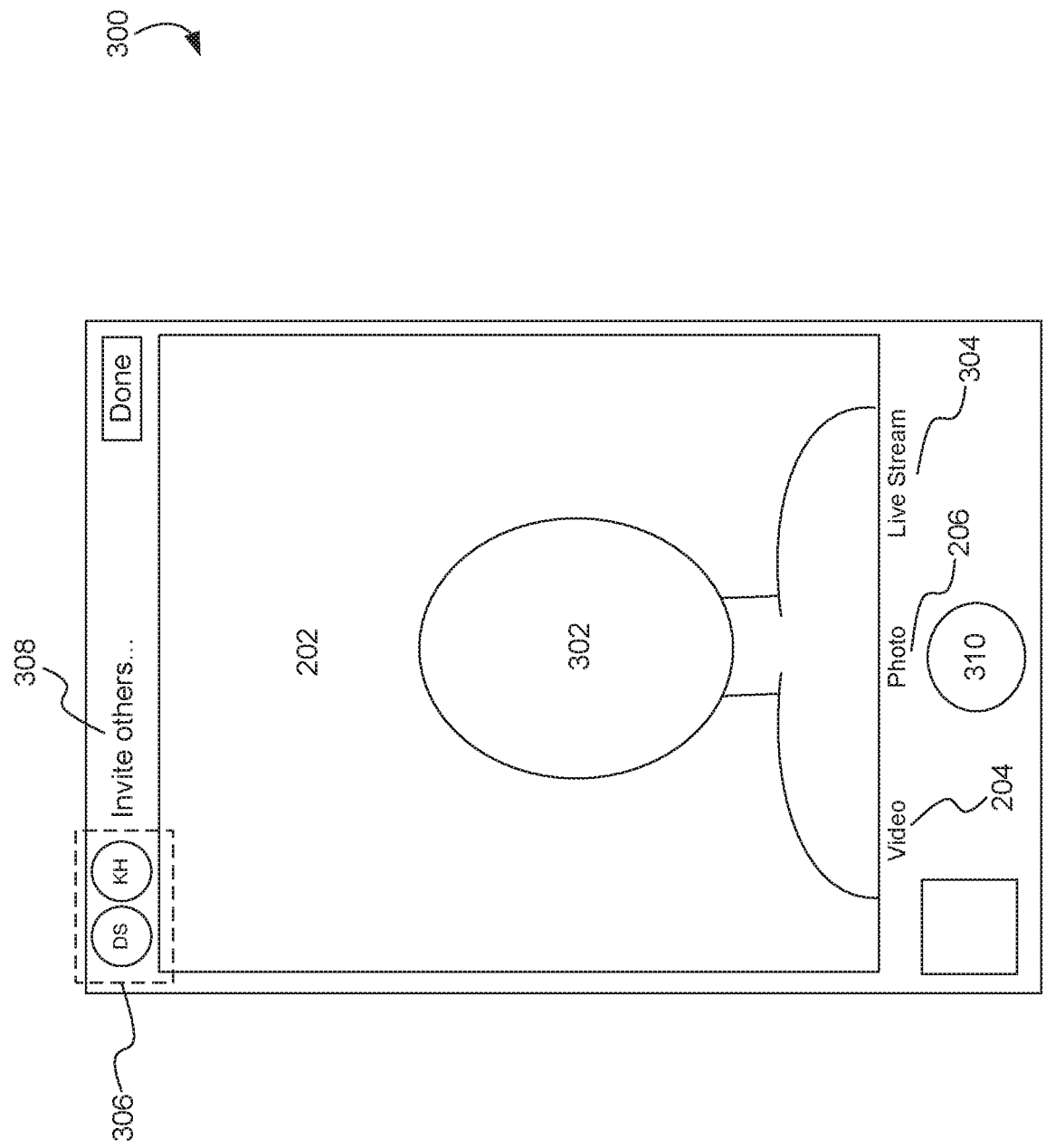
FIG. 3A illustrates a graphical user interface for generating a synthetic group selfie.

FIG. 3A illustrates a graphical user interface 300 for generating a synthetic group selfie. For example, GUI 300 can be presented by group selfie application 108 on a display of user device 102 in response to receiving a user selection of graphical element 210.

In some implementations, camera 104, depth sensor 105, and/or microphone 106 can be enabled or turned on in response to receiving the selection of graphical element 210 in preparation for receiving input from the user to capture an image. For example, when camera 104 is turned on, the image generated by camera 104 can be presented in area 202. The image generated by camera 104 can be an image 302 of the user. Image 302 can be generated, for example, by one or more forward facing cameras of user device 102.

In some implementations, GUI 300 can include image type selectors 204, 206, and/or 304. As described above, the user can select graphical element 204 to indicate that user device 102 (e.g., cameras 104 through group selfie application 108) should capture a video image to be stored on user device 102. The user can select graphical element 206 to indicate that user device 102 should capture a still image to be stored on user device 102. The user can select graphical element 304 to indicate that user device 102 should generate live streaming video to be transmitted to other devices. For example, user device 102 can generate live streaming video that can be transmitted to other user devices and/or social media services so that other people can watch the live streaming video in near real time as the video is generated by user device 102.

In some implementations, the image type selected by the synthetic group selfie originating user dictates the type of synthetic group selfie generated. For example, the user of user device 102 can select graphical element 210 to initiate the synthetic group selfie mode of group selfie application 108. Thus, the user can be the originator of the synthetic group selfie and user device 102 can be the originating device for the synthetic group selfie. The image type selected by the originating user can be sent to contributing user devices (e.g., contributor devices 120, 130, 140) so that the contributing user devices can be configured to capture individual selfies that correspond to the selected image type.

In some implementations, GUI 300 can include contributing user identifiers 306. For example, user identifiers 306 can represent (e.g., by image, by text, etc.) users that will be invited to contribute to the synthetic group selfie. The contributing users can be determined based on how near the contributing users' devices (e.g., contributor devices 120, 130, 140, etc.) are to the originating user's device (e.g., user device 102). For example, when user device 102 detects contributor device 120 within a threshold distance of user device 102, then group selfie application 108 can select contributor device 120 (e.g., the user of contributor device 120) to participate in the synthetic group selfie and present an identifier for the user of contributor device 120 in the list of user identifiers 306. In some implementations, proximity can be determined based on signals transmitted between user devices. For example, user device 102 can receive Bluetooth signals from contributor devices 120, 130, 140 and determine that contributor devices 120, 130, 140 are proximate to user device 102 when the signals are received because Bluetooth signal transmission ranges are so short. User device 102 can receive Bluetooth signals from contributor devices 120, 130, 140 and calculate the distance between user device 102 and contributor devices 120, 130, 140 based on time of flight information using well-known techniques. User device 102 can then determine which contributor devices are within a threshold distance of user device 102. Users (e.g., contributor devices) identified in user identifiers 306 will be invited to participate in the synthetic group selfie.

In some implementations, users identified in user identifiers 306 can be filtered based on contacts data stored on user device 102. For example, group selfie application 108 may only invite other users (e.g., contributing users) who are in the originating user's contacts database to participate in the synthetic group selfie.

While group selfie application 108 can automatically select users and/or contributor devices to participate in the synthetic group selfie based on proximity, the originating user (e.g., user of user device 102) can add or remove contributors to user identifiers 306. For example, the originating user can select graphical element 308 to invoke a graphical user interface for adding contributing users from the originating user's contacts database (e.g., contacts book, contacts list, etc.) or other source to the list of users (e.g., user identifiers 306) to be invited to participate in the synthetic group selfie. The originating user can select graphical element 308 to invoke a graphical user interface for removing contributing users from user identifiers 306.

In some implementations, GUI 300 can include graphical element 310 for capturing a synthetic group selfie. For example, the originating user can select graphical element 310 to capture an image of the originating user (e.g., image 302). Selection of graphical element 310 can cause group selfie application 108 to send invitations to contributing user devices corresponding to the contributing users identified by user identifiers 306. For example, group selfie application 108 on user device 102 can send messages to the group selfie applications on contributing devices 120, 130, and/or 140 that include an invitation to participate in a synthetic group selfie.

In some implementations, the invitation can specify the type of image to be captured by contributing devices 120, 130, and/or 140. For example, group selfie application 108 can specify in the invitation that contributing devices 120, 130 and/or 140 should capture a still image, a stored video image, or a live streaming video image according to the type of image selected on user device 102 when the user selects graphical element 310. Upon receipt of the invitation, contributing devices 120, 130, and/or 140 can be configured to capture the specified image type.

Figure 3B:
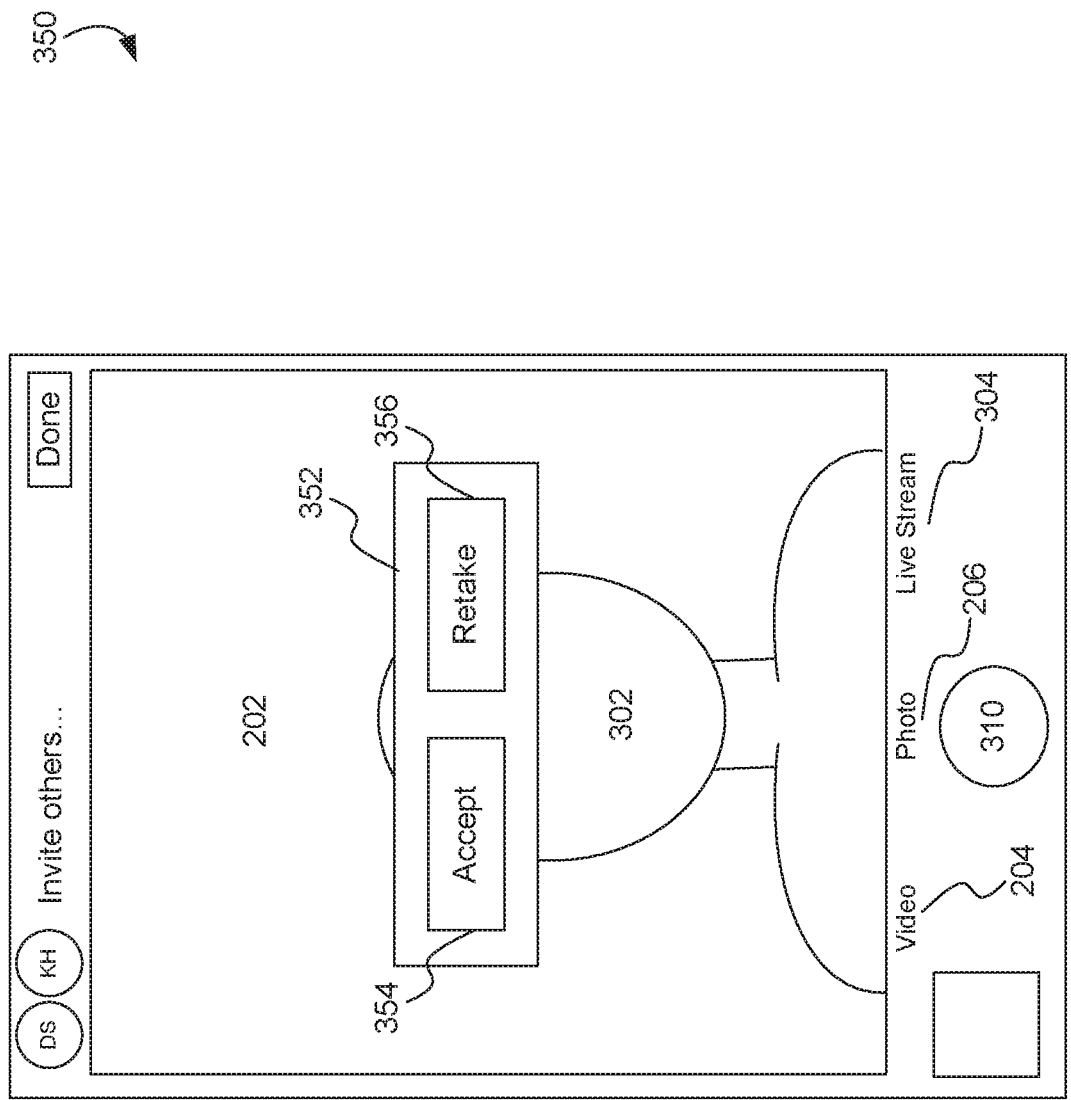
FIG. 3B illustrates an example graphical user interface presenting an option to recapture an image.

FIG. 3B illustrates an example graphical user interface 350 presenting an option to recapture an image. For example, GUI 350 can be presented by group selfie application 108 after capturing a still image and/or after storing a video image.

In some implementations, GUI 350 can present graphical element 352 that presents options for accepting or retaking (recapturing) a still image or stored video image. If the originating user likes the captured image, the user can select graphical element 354 to accept the captured image. In response to receiving the user selection of graphical element 354, group selfie application 108 can store the captured image (e.g., still image, video, etc.) and use the image in the synthetic group selfie generated by group selfie application 108. If the originating user does not like the captured image, the user can select graphical element 356 to recapture the image. In response to receiving a selection of graphical element 356, group selfie application 108 can present GUI 300 of FIG. 3A.

Figure 4:
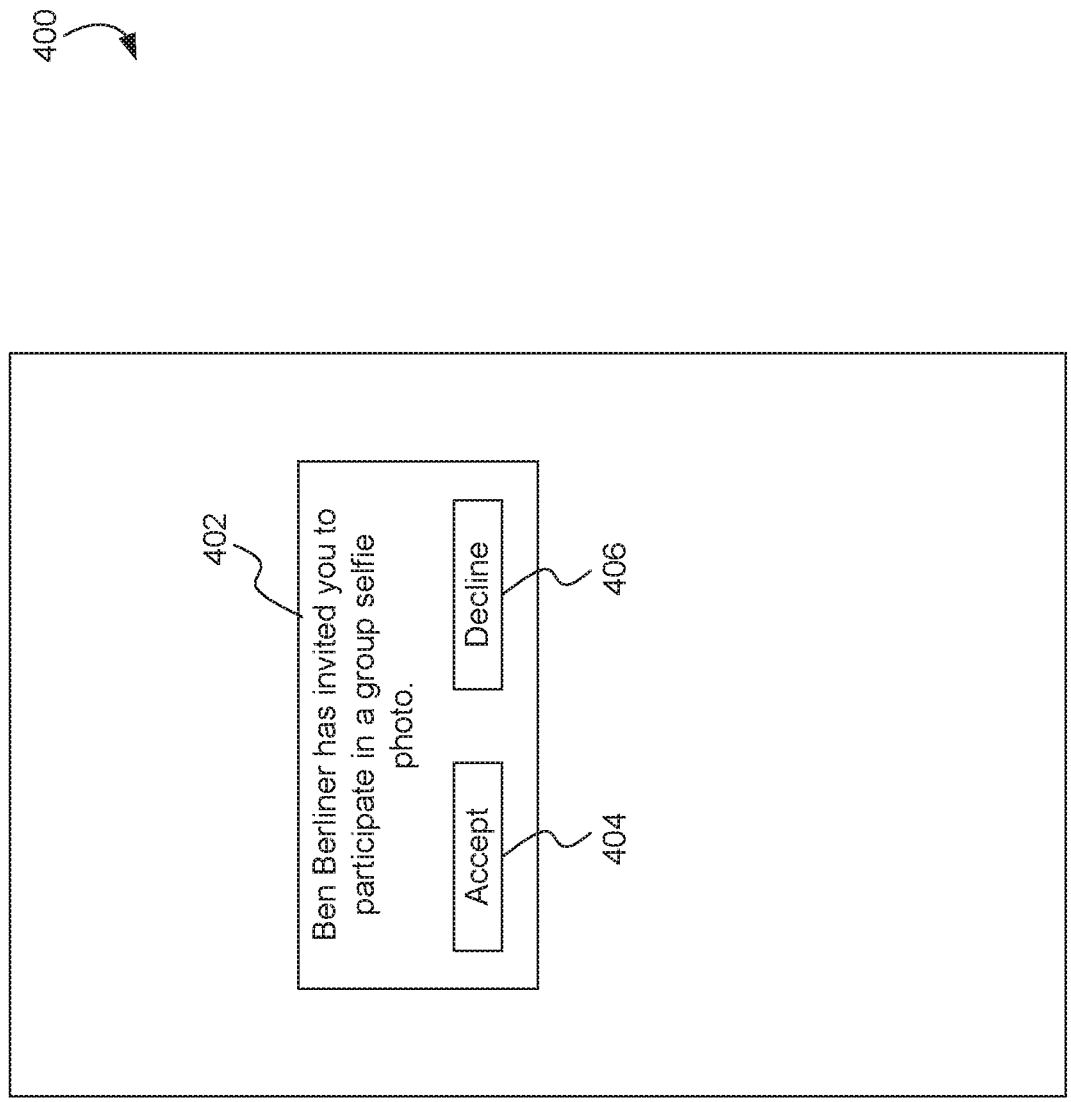
FIG. 4 illustrates an example graphical user interface prompting a contributor user to participate in a synthetic group selfie.

FIG. 4 illustrates an example graphical user interface 400 prompting a contributor user to participate in a synthetic group selfie. For example, when contributor devices 120, 130 and/or 140 receive a message inviting the users of these devices (e.g., contributing users) to participate in a synthetic group selfie, a notification 402 can be presented on GUI 400 indicating that the user has been invited to participate in a synthetic group selfie. If the user does not wish to participate (e.g., contribute an individual selfie to the synthetic group selfie), then the user can select graphical element 406 to dismiss notification 402. If the user wishes to participate (e.g., contribute an individual selfie to the synthetic group selfie), then the user can select graphical element 404. In response to receiving a user selection of graphical element 404, the contributor device (e.g., contributor device 120, 130, or 140) can invoke group selfie application 108 and provide parameters for the synthetic group selfie to the group selfie application. For example, the parameters can include an indication that the user is participating in or contributing to a synthetic group selfie. The parameters can indicate the type of image (e.g., still image, stored video image, live streaming video image, etc.). Upon receiving the parameters, the group selfie application on the contributor device can present a graphical user interface configured to capture an individual selfie corresponding to the image type specified in the synthetic group selfie invitation, as illustrated by FIG. 5.

Figure 5:
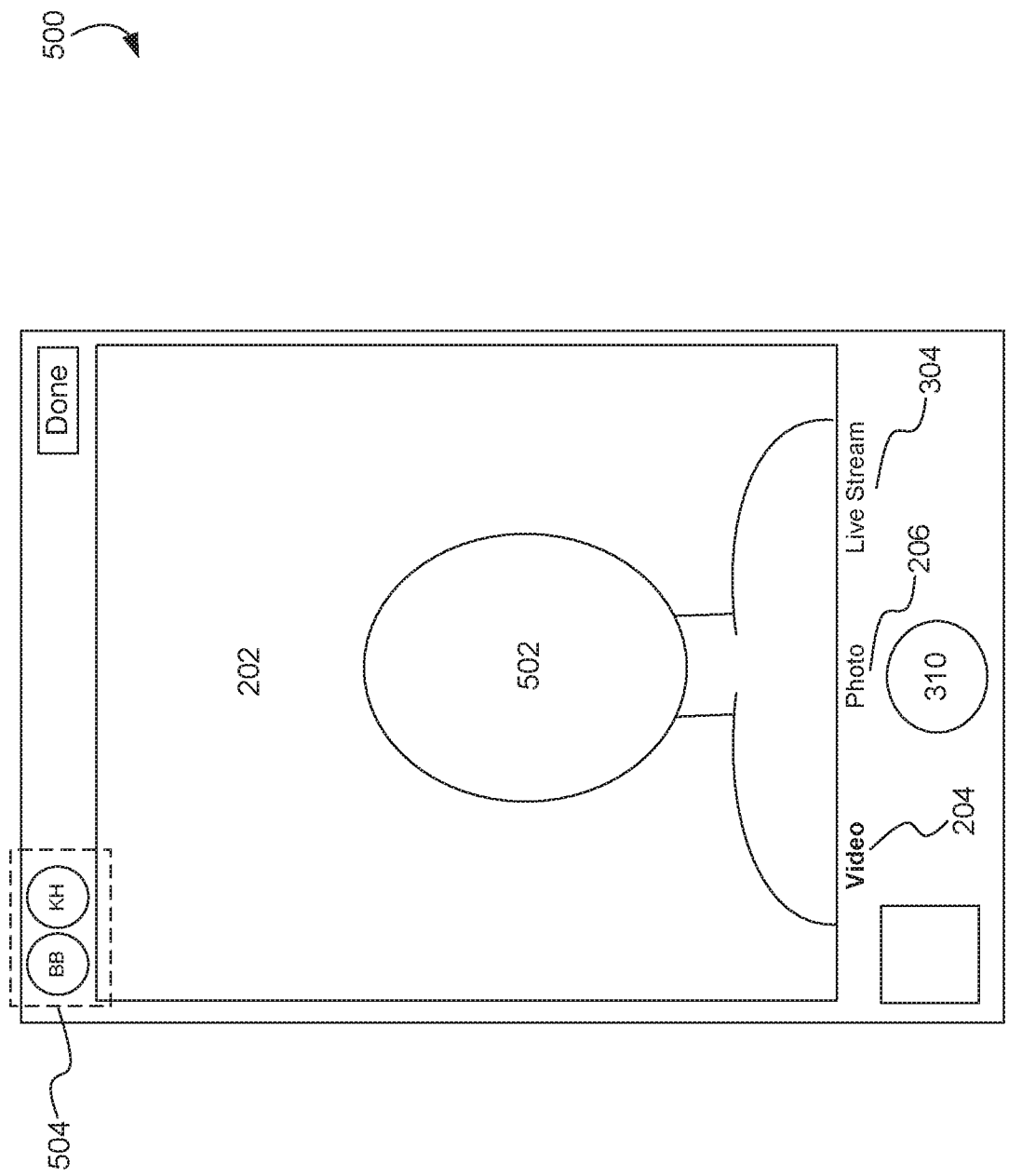
FIG. 5 illustrates an example graphical user interface for capturing an individual selfie to be included in a synthetic group selfie.

FIG. 5 illustrates an example graphical user interface 500 for capturing an individual selfie to be included in a synthetic group selfie. For example, after a contributing user selects graphical element 404 on GUI 400, the group selfie application on the contributor device (e.g., contributor device 120) can present GUI 500.

In some implementations, GUI 500 can be similar to GUI 300 of FIG. 3. For example, GUI 500 can include image area 202 for previewing an image 502 (e.g., an individual selfie) of the contributing user to be captured by the camera of the contributor device. GUI 500 can include user identifiers 504 that represent and/or identify the other users (e.g., originating user, contributing users, etc.) that are participating in or contributing to the synthetic group selfie. For example, the contributor device can receive information identifying the participating users in the invitation to participate in the synthetic group selfie received from user device 102 (e.g., the originating device).

In some implementations, GUI 500 can include image type selectors 204, 206, and/or 304. For example, the originator of the synthetic group selfie can select the image type for the synthetic group selfie. When a contributor device receives the invitation to participate in the synthetic group selfie, the invitation can specify the type of image (e.g., still image, stored video image, streaming live video image, etc.) to be captured by contributor devices. When GUI 500 is presented by a contributor device (e.g., contributor device 120), the type of image to be captured using GUI 500 can be preselected for the contributing user. Thus, if the originating user selects a stored video image as an image type, GUI 500 can be automatically configured so that the contributing user can capture a stored video image. The user can then compose the image using the image viewer and cause the contributor device to capture and/or store the contributor user's image 302 according to the image type specified in the invitation by selecting graphical element 310.

Figure 6:
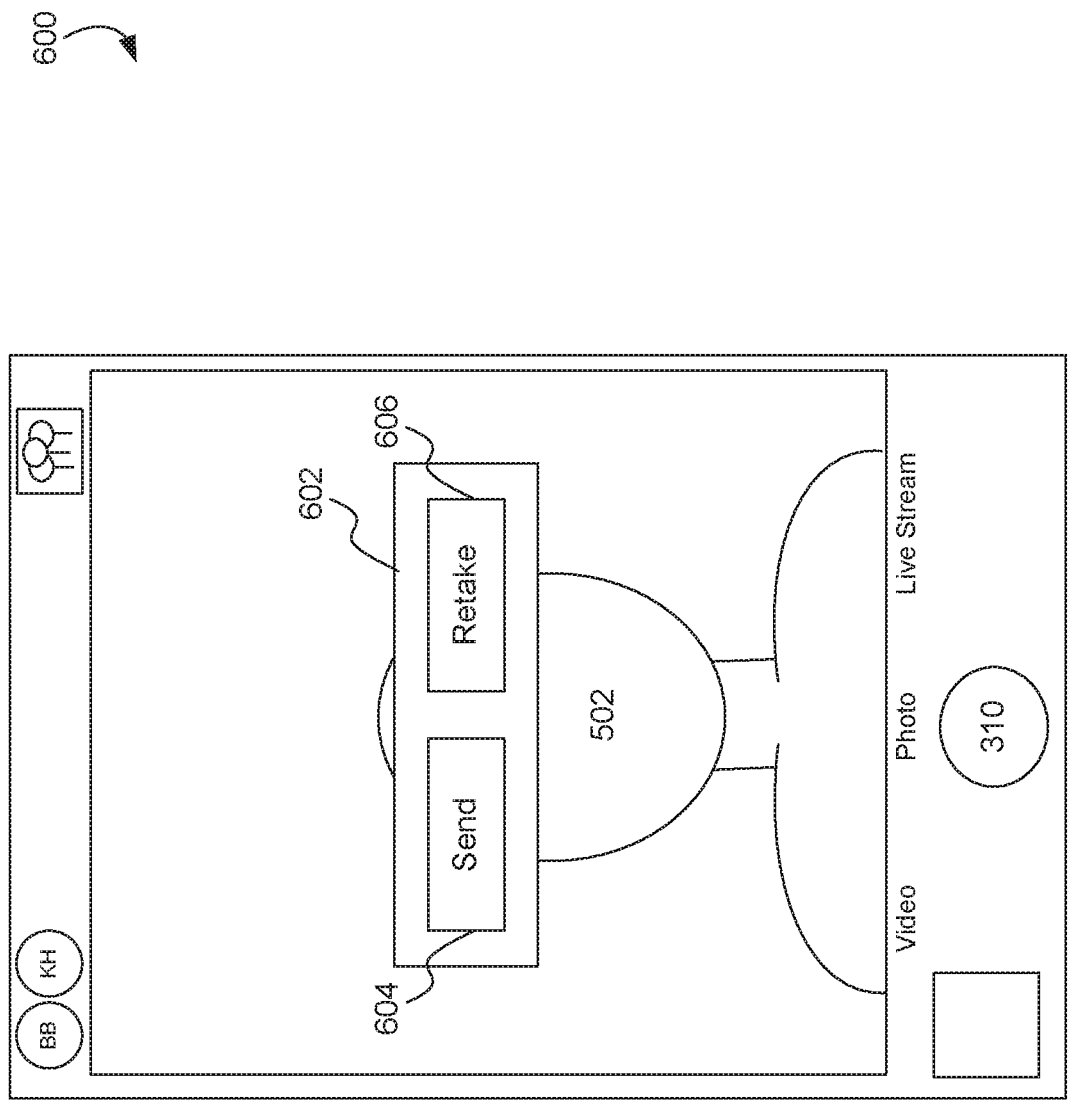
FIG. 6 illustrates an example graphical user interface presenting an option to recapture an image.

FIG. 6 illustrates an example graphical user interface 600 presenting an option to recapture an image. For example, GUI 600 can be presented by a group selfie application on a contributor device after capturing a still image and/or after storing a video image.

In some implementations, GUI 600 can present graphical element 602 that presents options for accepting and/or retaking (recapturing) a still image or stored video image. If the contributing user likes the captured image, the contributing user can select graphical element 604 to accept the captured image. In response to receiving the contributing user selection of graphical element 604, the group selfie application can store the captured image (e.g., still image, video, etc.) and send the image (e.g., the individual selfie) to group selfie application 108 on user device 102 so that the image can be used in the synthetic group selfie generated by group selfie application 108. If the contributing user does not like the captured image, the contributing user can select graphical element 606 to recapture the image. In response to receiving a selection of graphical element 606, the group selfie application on the contributor device can present GUI 500 of FIG. 5.

In some implementations, the contributor device can modify the individual selfie before sending the individual selfie to originating user device 102. For example, contributor device 120 can capture an individual selfie and send the entire individual selfie image to originating user device 102. However, since user device 102 would likely remove the background portion of the individual selfie before combining the individual selfie with other individual selfies to generate the synthetic group selfie, contributor device 120 can, in some implementations, remove the background portion of the individual selfie image before sending the individual selfie to user device 102.

For example, the individual selfie can include a foreground portion (e.g., corresponding to the image of the person captured in the image or the object closest to the camera) and a background portion (e.g., corresponding to objects behind the person or object captured in the image). Contributor device 120 (or user device 102) can determine the foreground and background portions of an image based on the depth data generated for the captured image. Objects (e.g., people) in the foreground may have smaller values for the depth data. Objects (e.g., trees) in the background may have larger values for the depth data. Contributor device 120 can use the depth values to distinguish between foreground and background objects in the image and identify foreground and background portions of the image corresponding to the captured objects. Contributor device 120 can then modify the image (e.g., the individual selfie) to preserve the foreground portion of the image (e.g., the person) while removing the background portion of the image. Thus, the individual selfie image sent to user device 102 may only include the individual person who was in the foreground when the individual selfie was captured by contributor device 120.

Figure 7:
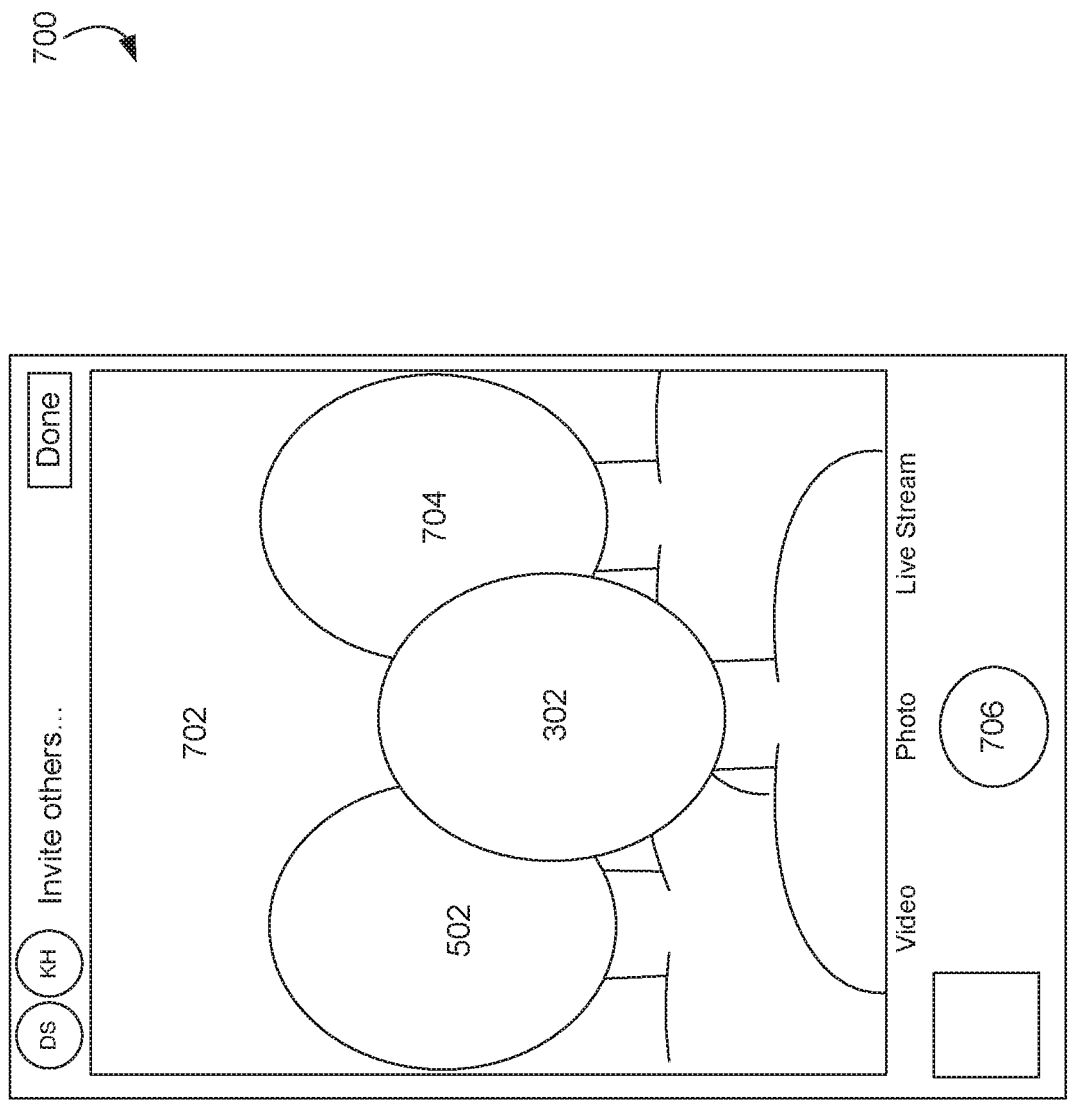
FIG. 7 illustrates an example graphical user interface for presenting a preview of a synthetic group selfie.

FIG. 7 illustrates an example graphical user interface 700 for presenting a preview of a synthetic group selfie. For example, GUI 700 can be presented by group selfie application 108 on a display of user device 102. GUI 700 can present a preview of an arrangement of individual selfies (e.g., a synthetic group selfie) received from contributor devices and generated by group selfie application 108 on originating user device 102.

In some implementations, group selfie application 108 can receive individual selfies from contributor devices. For example, group selfie application 108 can receive individual selfies from contributor devices 120, 130, and/or 140. As described above, the individual selfies received by user device 120 can include foreground and background portions of the individual selfie or just the foreground portion of the individual selfies. When the complete selfie (e.g., foreground and background portions) is received by group selfie application 108 on user device 102, group selfie application 108 can process the individual selfie to remove the background portion of the image using the depth information described above. Alternatively, the individual selfies received by user device 102 may include only the foreground portion of the image (e.g., the pixels corresponding to the image of the person in the foreground of the selfie image) when the contributing device has already removed the background portion of the individual selfie.

In some implementations, group selfie application 108 can automatically arrange individual selfies into a synthetic group selfie. For example, group selfie application 108 can automatically combine the originating user's individual selfie with individual selfies received from contributor devices 120, 130, and/or 140 to generate a synthetic group selfie. The synthetic group selfie can be a composite of the foreground portions of individual selfies (e.g., images 302, 502, 704, etc.) and a background image 702. Background image 702 can correspond to the background portion of the originating user's individual selfie. For example, group selfie application 108 can separate the foreground portion of the originating user's individual selfie from the background portion of the originating user's individual selfie using the depth data as described above. The background portion can be saved and used as the background image for the synthetic group selfie. The user can select a background image from media database 110 stored on user device 102. The background image can be a still image. The background image can be a stored video image. The background image can be a live video image (e.g., a live video feed) generated in real time by camera(s) 104 and presented in real time (e.g., as it is captured) by user device 102.

Each individual selfie can be positioned within the synthetic group selfie according to various criteria. For example, the individual selfies, including the originator's selfie, can be scaled based on the number of individual selfies included in the synthetic group selfie. The individual selfies can be scaled and/or positioned such that the faces in the in the individual selfies are not completely hidden. For example, the individual selfies can be scaled and/or positioned such that less than a threshold percentage (e.g., 20%) of the face in an individual selfie is obscured. Individual selfies can be positioned such that identifying features of a face (e.g., the eyes, nose, mouth, etc.) in an individual selfie are not obscured.

In some implementations, individual selfies can be positioned based on the relationship that the person in the individual selfie has with the originating user. For example, group selfie application 108 can use face recognition and/or face identification technology in combination with contacts information to determine a relationship between people depicted in the individual selfies. The originating user can have contact information that identifies family members, friends, colleagues, etc. When an individual selfie is received by group selfie application 108, group selfie application 108 can match a face in the individual selfie to faces associated with contact information stored on user device 102. Based on this comparison, group selfie application 108 can determine that the face in the individual selfie corresponds to a family member or friend in the originating user's contact information. Group selfie application 108 can then position the individual selfie corresponding to the originator's friend or family member nearer to the originator's individual selfie in the synthetic group selfie than a colleague or unidentified person. For example, group selfie application 108 can prioritize relationships and place individual selfies corresponding to contributors having higher priority relationships with the originating user closer to the originating user in the synthetic group selfie. An example prioritization from highest priority to lowest priority could be: family members, friends, colleagues, identified contacts, and unidentified persons.

In some implementations, a person's relationship with the originating user can be determined based on frequency of communication with the originating user. For example, if a person frequently sends text messages to the originating user, this activity could be an indication of a close relationship between the person and the originating user. When group selfie application 108 receives an individual selfie from this person, group selfie application can determine that this person frequently communicates with the originating user and can place the individual selfie corresponding to this person closer to the originating user's individual selfie than other individual selfies received from people that the originating user communicates with less frequently.

When group selfie application 108 receives the individual selfies from contributing devices, group selfie application 108 can compose the individual selfies and background image into a synthetic group selfie and present a preview of the synthetic group selfie on GUI 700. Thus, GUI 700 can include a background image 702, contributor individual selfies 502 and 704, and the originator's individual selfie 302.

When the originating user is satisfied with the appearance of the synthetic group selfie, the originating user can select graphical element 706 to cause group selfie application 108 to save the synthetic group selfie. For example, the synthetic group selfie can be saved as a multi-resource object that includes the individual selfies (and corresponding metadata) of each contributing user, the individual selfie of the originating user, the background image, and/or configuration data describing how to compose each image into the synthetic group selfie.

Figure 8:
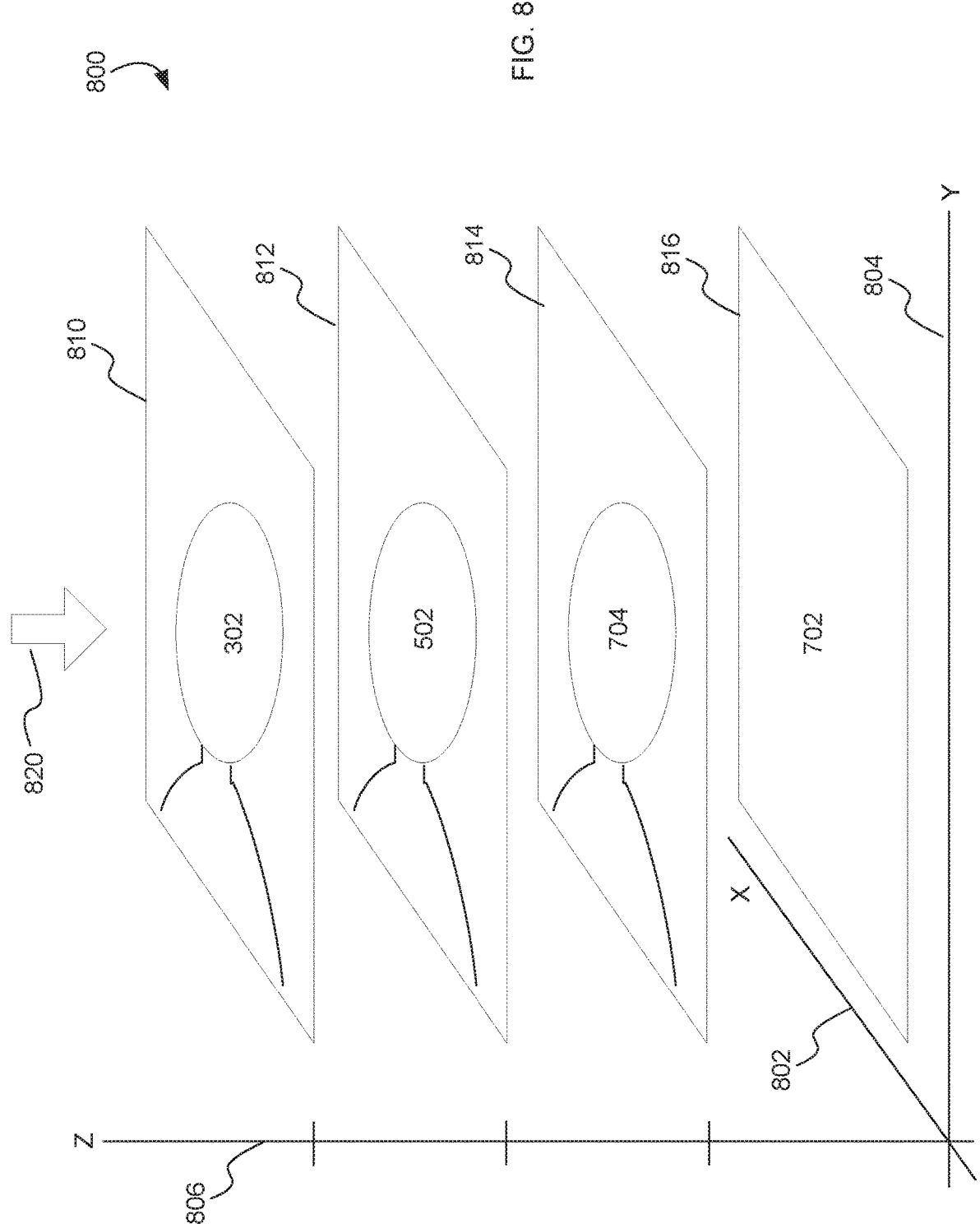
FIG. 8 is a diagram illustrating an example synthetic group selfie composition technique.

FIG. 8 is a diagram 800 illustrating an example synthetic group selfie composition technique. For example, synthetic group selfies can be generated by overlaying layers of individual selfies over a background image. Continuing the example above, the originator device (e.g., user device 102) of the synthetic group selfie can capture an individual selfie (e.g., image 302) of the originator user and receive individual selfies (e.g., images 502 and 704) from one or more other contributing devices corresponding to other users (e.g., contributors) who have elected to participate in the synthetic group selfie. The background image 702 can be obtained from the originator's individual selfie or selected by the originator from images stored on user device 102.

In some implementations, each image (e.g., individual selfies, background image, etc.) can be positioned at a different layer of the synthetic group selfie. For example, a user may view the synthetic group selfie from the perspective of arrow 820. Thus, layers 810, 812, 814, and 816 can represent different depths (e.g., in the third dimension, z-dimension, etc.) within the synthetic group selfie image. In some implementations, the individual selfie of the originating user can be at the top most (e.g., closest to the viewing user) layer 810, individual selfies corresponding to other contributing users can be positioned at intermediate layers 812 and 814, while the background image can be at layer 816 furthest from the viewing user. When the individual selfies are combined with the background image to generate the synthetic group selfie, it will appear that the contributing users are positioned behind the originating user in the synthetic group selfie with the background image in the background behind all of the people in the image.

In some implementations, the positions of contributor individual selfies can be automatically determined based on the relationships of the contributing users to the originating user. As described above, the individual selfies corresponding to contributors that have closer relationships (e.g., family, friends, frequent contacts, etc.) with the originating user can be placed nearer to the originating user's individual selfie than other contributors that are not as close with the originating user. The positions of contributors' individual selfies can be determined in three dimensions. For example, when looking at a synthetic group selfie, a coordinate system can be imposed on the synthetic group selfie where the x-axis 802 corresponds to a horizontal axis, the y-axis 804 corresponds to a vertical axis, and the z-axis 806 corresponds to depth (e.g., the third dimension, or layers). Group selfie application 108 can position individual selfies representing contributing users that have close relationships to the originating user closer to the individual selfie of the originating user in x, y, and z axis. Thus, an image of a contributing user who has the closest relationship with the originating user can be placed at an x, y location near the image of the originating user at a position on the z-axis that places the contributing users image closest to the originating user (e.g., at image layer 812). The number of image layers in a synthetic group selfie can correspond to the number of individual selfies to be included in the synthetic group selfie plus one (e.g., for the background image).

Returning to FIG. 7, the layering approach can allow for some interesting user interactions with the synthetic group selfie. For example, since the individual selfies are preserved when generating a synthetic group selfie and each individual selfie occupies a different layer with in the synthetic group selfie, group selfie application 108 can provide a zoom feature that allows a user to view the images at different layers of the synthetic group selfie. For example, when interacting with GUI 700, the user can provide input to zoom into the synthetic group selfie presented on GUI 700. As the user zooms into the synthetic group selfie, the representation of the synthetic group selfie presented on GUI 700 can change. For example, the representation of the synthetic group selfie may change to remove image 302 of the originating user from the synthetic group selfie such that it appears that the user has zoomed past the image of the originating user in the foreground of the synthetic group selfie. If the user continues zooming into the synthetic group selfie, the representation of the synthetic group selfie presented by GUI 700 may zoom past the other individual selfies of the contributing users until only the background image is presented on GUI 700. Stated differently, group selfie application 108 can provide a mechanism by which a viewing user can zoom into specific levels to view images that may be otherwise obscured by overlapping images positioned at higher levels within the synthetic group selfie.

Figure 9:
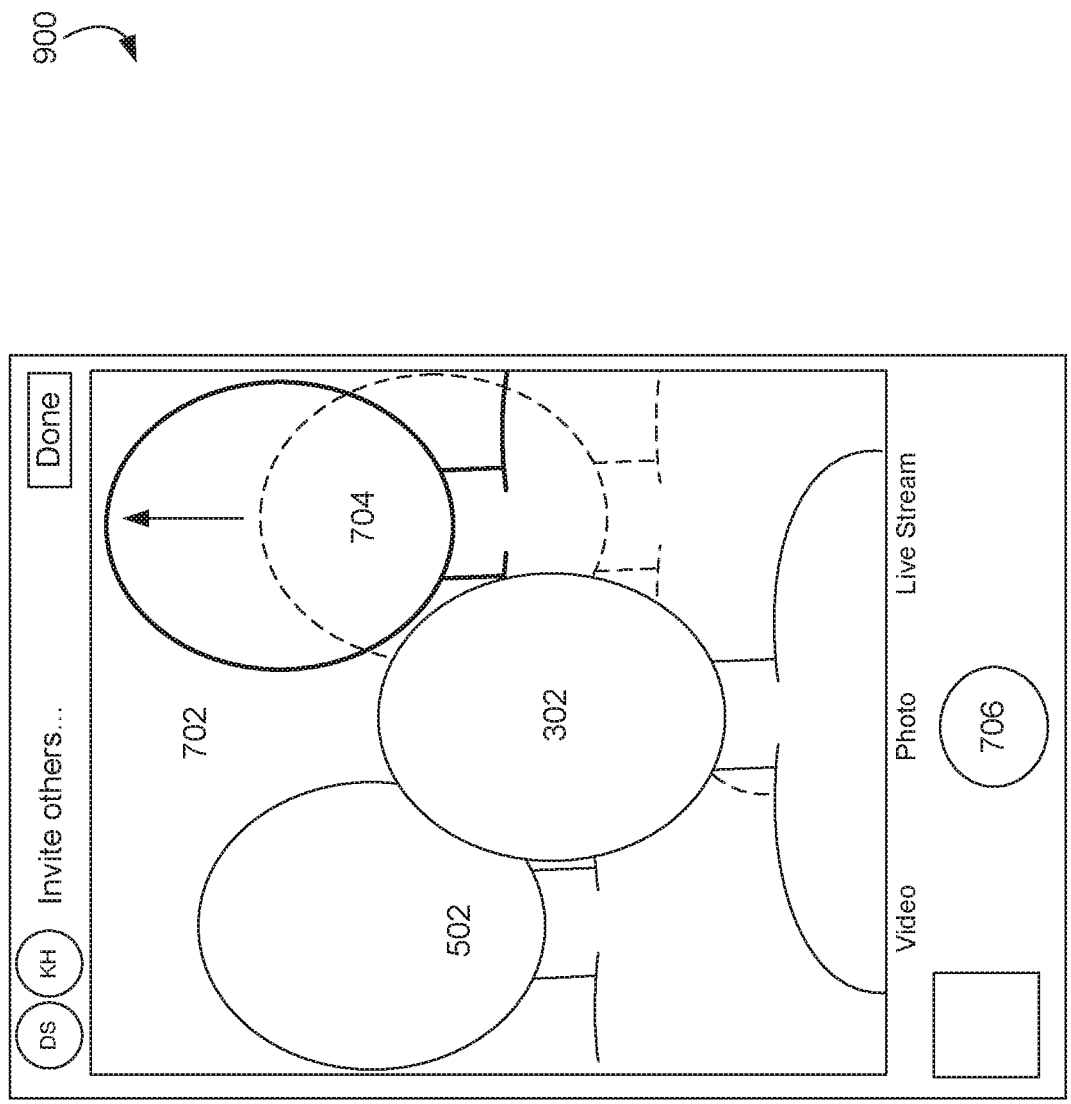
FIG. 9 illustrates an example graphical user interface for editing a synthetic group selfie.

FIG. 9 illustrates an example graphical user interface 900 for editing a synthetic group selfie. For example, GUI 900 can be presented by group selfie application 108 on a display of user device 102. GUI 900 can present a synthetic group selfie, as described above with reference to GUI 700 of FIG. 7. To edit or rearrange the individual selfies within the synthetic group selfie, the user can provide touch input dragging an individual selfie to a new position within the synthetic group selfie. For example, the user can touch individual selfie image 704 and drag image 704 upward in the synthetic group selfie image to reveal more of the face of the person captured by individual selfie image 704. The user can reposition an individual selfie anywhere within the synthetic group selfie using this select and drag input.

In some implementations, a user can change background image 702 through GUI 900. For example, the user can select (e.g., touch) and hold (e.g., for 3 seconds) a portion of background image 702 to cause group selfie application 108 to present a graphical element for selecting a new background image. The user can select a background image from images stored on user device 102. After selecting the background image, group selfie application 108 can present the selected background image in the background of the synthetic group selfie.

While the above describes generating synthetic group selfies generally in terms of images that can be still images, stored video images, or live streaming video images, there may be some special features or behaviors that may be specific to still images, stored video and/or streaming video synthetic group selfies. These features are described in the following paragraphs.

Still Image Synthetic Group Selfies

As described above, an originating user can initiate the creation of a synthetic group selfie. The originating user's device can capture a self-image of the originating user and send invitations to contributing users to participate in the synthetic group selfie. As each contributing device sends their respective individual selfies to the originating device, the received individual selfie can be added to the preview image presented on the originating users device. The preview image can be dynamically adjusted as each individual selfie is received at the originating user's device. The adjustments can include adding individual selfies to the preview image on the originating user's device. The adjustments can include adjusting the position and/or size (e.g., scale) of the individual selfies added to the preview image on the originating user's device (e.g., user device 102). Thus, the originating user can observe the changes to the preview of the synthetic group selfie as individual selfies are automatically added to the preview of the synthetic group selfie presented by user device 102.

Video Synthetic Group Selfies

As described above, system 100 can generate synthetic group selfies using stored video images. The term "stored video image" refers to a video recording that is captured and (e.g., persistently) stored by a computing device. A stored video image can be stored in media database 110, for example, and later shared or transmitted to other devices. In contrast and as described below, the term "streaming video image" refers to a life video image that is captured and streamed in near real time to other devices (e.g., streamed to social media service 152). The streaming video image may or may not be stored. However, when stored, the streaming video image becomes a stored video image.

In some implementations, a synthetic group selfie can include stored video images. Referring back to FIG. 3A, the originating user can initiate a synthetic group selfie by selecting graphical element 312 to capture a self-image of the originating user and invite contributing users to participate in the synthetic group selfie. However, when the originating user selects stored video image as the image type, selecting graphical element 312 causes group selfie application 108 to capture a video recording of the originating user. This video recording can include video data captured by cameras 104 and/or audio data captured by microphone 106. The originating user can end the video recording by selecting graphical element 310 again.

When contributing user devices (e.g., contributing devices 120, 130, 140) receive an invitation to participate in a video synthetic group selfie, the contributing devices can be configured to capture individual video selfies. The contributing users can capture video images of themselves using the cameras and microphones of the contributing user devices similarly to the mechanisms described with respect to user device 102. After the video of the contributing user is captured (recorded) by the contributing user device, the captured video image can be stored on the contributing user device and/or transmitted to the originating user's device (e.g., user device 102).

When the stored video images are received from the contributing user devices, group selfie application 108 can add the received stored images to the preview of the synthetic group selfie presented by user device 102. Similarly to still images, the stored video images can be dynamically added to the synthetic group selfie preview as they are received from the contributing devices. However, in the case of stored video images, the received video images can be played back in the synthetic group selfie preview. Thus, the synthetic group selfie preview can include and playback individual video selfies corresponding to the originating user and each contributing user. The individual video selfies can be looped in the synthetic group selfie preview so that the originating user can adjust the timing, location, and other aesthetic features of the stored video synthetic group selfie before saving the stored video synthetic group selfie.

Streaming Video Synthetic Group Selfies

In some implementations, group messaging application 108 can generate a live streaming video synthetic group selfie. For example, a live streaming video synthetic group selfie can be initiated when the originating user selects "live streaming video image" as the image type and selects graphical element 310 to initiate the video stream and invite contributing users to participate in the synthetic group selfie. The originating user can provide input to configure group selfie application 108 to send the live streaming video to the originating user's favorite web server, social media website (e.g. social media service 152), other user device, or other receiving device. In response to receiving the user input selecting graphical element 310, group selfie application 108 can capture a live video stream using camera(s) 104 and send the live video stream to the selected recipient device. When the originating user selects graphical element 310 after initiating the live video stream, the live streaming video synthetic group selfie can be terminated.

When a contributing device receives an invitation to participate in a live video synthetic group selfie, the contributing device can be configured to generate a live video stream from the contributing user device to user device 102. The contributing user can initiate the live video stream by selecting graphical element 310 presented by the group selfie application on the contributing user device. While capturing or generating the live video stream at the contributing user device, the contributing user device can send the live video stream to user device 102 in near real time. When user device 102 receives the live video streams from the contributing user devices, group selfie application 108 can generate a synthetic group selfie that is a composite of all of the live video streams received from the contributing user devices and the live video stream generated by user device 102 that is capturing the video of the originating user. This synthetic group selfie can be transmitted in near real time as a live video stream to the selected recipient device. In some implementations, the live video synthetic group selfie can be stored on user device 102. Thus, the live video synthetic group selfie can become a stored video group selfie when stored on user device 102.

Figure 10:
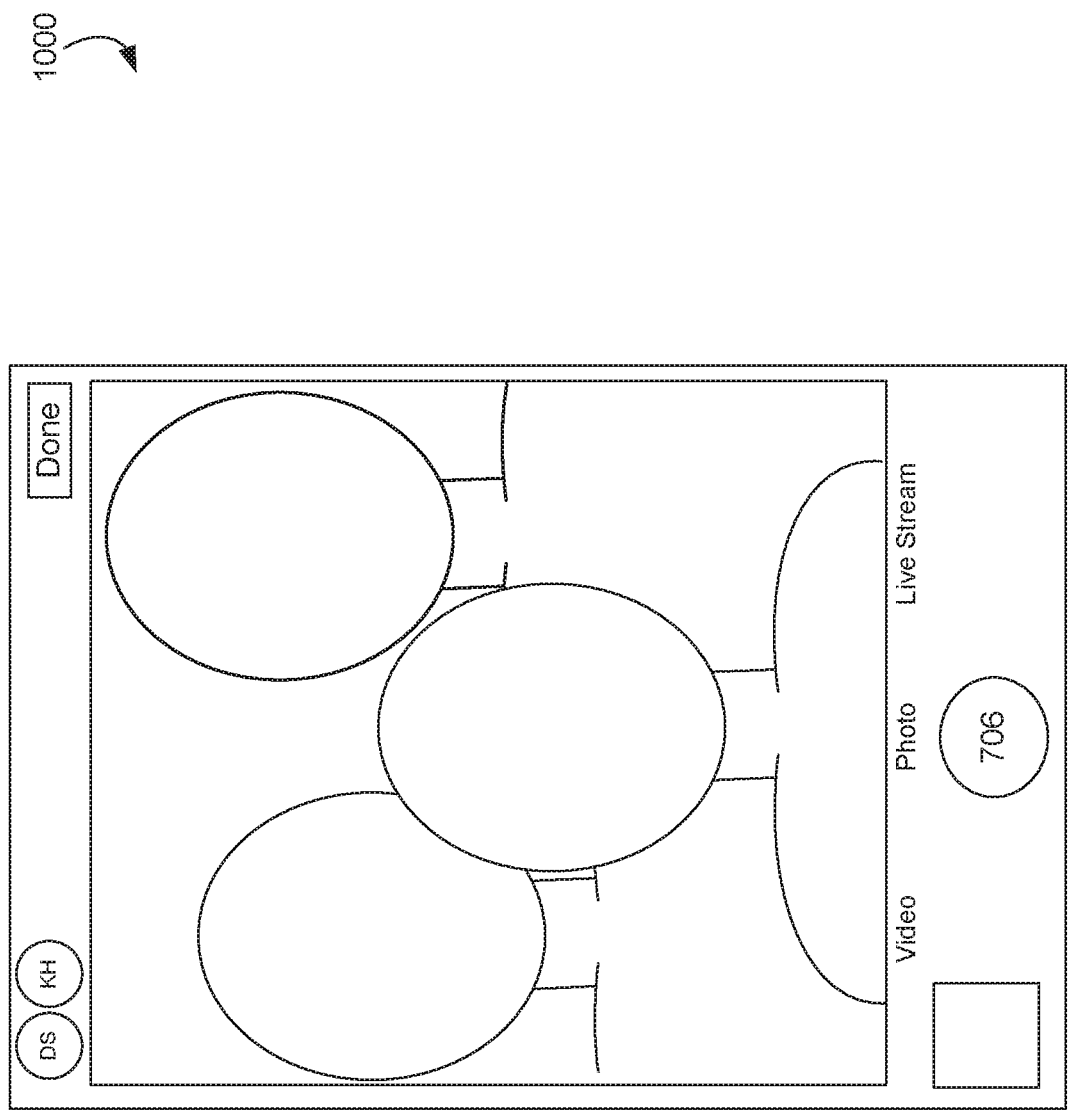
FIG. 10 illustrates an example graphical user interface for storing a synthetic group selfie.

FIG. 10 illustrates an example graphical user interface 1000 for storing a synthetic group selfie. For example, GUI 1000 can be presented by group selfie application 108 on display of user device 102.

In some implementations, after generating a preview of the synthetic group selfie on user device 102, group selfie application 108 can receive input to store or save the synthetic group selfie. For example, after presenting the composition of contributing user individual selfies and the originating user's individual selfie on GUI 700, the originating user can select graphical element 706 to cause group selfie application 108 to store the synthetic group selfie in media database 110. Group selfie application 108 can store the synthetic group selfie as a multi-resource object that stores the individual selfies and background image that comprise the synthetic group selfie as separate resources (e.g., files, objects, etc.). For example, the stored multi-resource object that corresponds to the still image synthetic group selfie will include separate still images for each individual selfie in the synthetic group selfie. The stored multi-resource object that corresponds to the stored video synthetic group selfie will include separate video objects for each individual selfie in the synthetic group selfie.

When storing the synthetic group selfie, group selfie application 108 can store configuration data in the multi-resource object that defines the presentation layout or organization of the resources (e.g., images, videos, etc.) in the synthetic group selfie so that a group selfie application that receives the multi-resource object (e.g., the synthetic group selfie) can compose the synthetic group selfie for presentation based on the configuration data and the resources in the multi-resource object. By sharing or sending a synthetic group selfie as a multi-resource object, a recipient device having a group selfie application can edit the synthetic group selfie. For example, if a contributing user device receives a synthetic group selfie composed by an originating user device, the contributing user may rearrange the individual selfies in the synthetic group selfie so that the contributing user is located at a prominent position in the synthetic group selfie. In some implementations, the contributing user device can automatically rearrange the synthetic group selfie to put the contributing user front and center in the synthetic group selfie and automatically position other individual selfies (e.g., from other contributing users and from the originating user) around the contributing user based on the relationships between the participants in the synthetic group selfie, as described above.

However, in some implementations, a receiving device may not include a group selfie application. In this case, group selfie application 108, or user device 102, can flatten the multi-resource object into a single image. For example, a user may wish to send a synthetic group selfie to another device that is not configured to process synthetic group selfie multi-resource objects. When the user attempts to send the synthetic group selfie (e.g., by text message, by social media server, etc.), group selfie application 108 can combine (e.g., flatten) the individual selfie images in the multi-resource object into a single image (e.g., single still image or single video) having a common image format that has a layout defined by the configuration data in the multi-resource object. User device 102 can then send the single image to the recipient device.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 11:
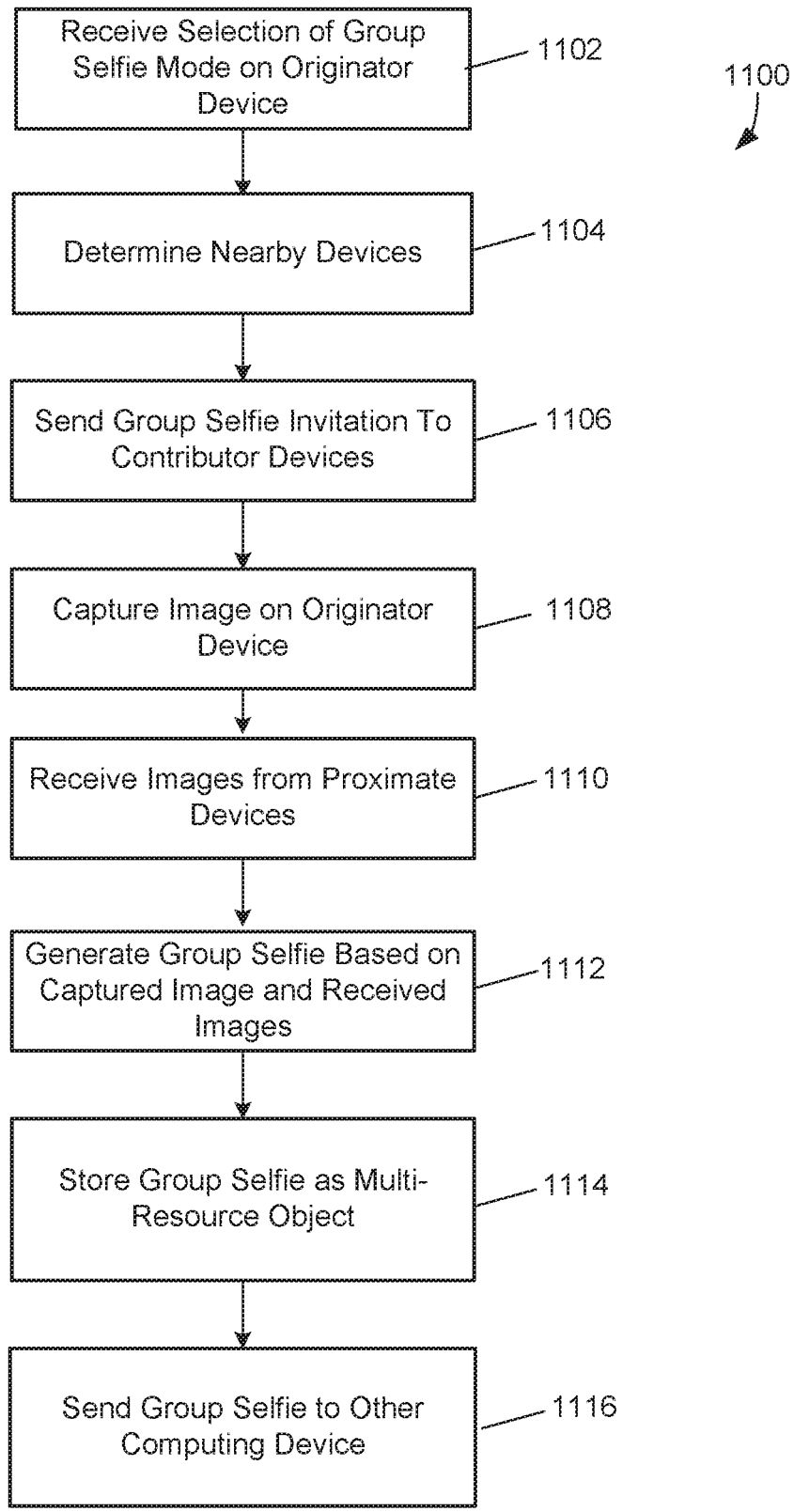
FIG. 11 is flow diagram of an example process for generating synthetic group selfies.

FIG. 11 is flow diagram of an example process 1100 for generating synthetic group selfies. For example, process 1100 can be performed by an originating user device (e.g., user device 102) to generate a synthetic group selfie by combining individual selfies generated by multiple user devices (e.g., user device 102, contributing devices 120, 130, 140).

At step 1102, user device 102 can receive a selection of a group selfie mode. For example, the user (originating user) of user device 102 can select a graphical element for triggering a group selfie mode of group selfie application 108 on user device 102, as described above with reference to FIG. 2.

At step 1104, user device 102 can determine nearby devices. For example, user device 102 can receive wireless signals (e.g., Bluetooth signals, Wi-Fi signals, etc.) from other user devices (e.g., contributor devices 120, 130, 140) near or proximate to user device 102. User device 102 can determine that the other user devices are proximate to user device 102 when these signals are received because these types of signals have short transmission ranges. Alternatively, user device 102 can receive wireless signals from other devices, determine a distance to the other devices based on the wireless signal (e.g., based on time of flight information), and determine that the other devices are near or proximate to user device 102 when the other user devices are within a threshold distance of user device 102.

At step 1106, user device 102 can send group selfie invitations to contributor devices. For example, the contributor devices can be automatically determined or selected based on the determined nearby devices. The originating user of user device 102 can provide input to add or remove contributor devices. The originating user can provide input to cause user device 102 to send group selfie invitations to the contributor devices. The group selfie invitations can identify a type of image (e.g., still image, stored video image, live video image, etc.) to capture. The group selfie invitation can identify other people (e.g., users, contributors, etc.) who are being invited to participate in the synthetic group selfie.

At step 1108, user device 102 can capture an individual selfie on the originator device. For example, group selfie application 108 on user device 102 can capture an individual selfie of the originating user. The individual selfie can be a still image, a stored video image, or a live streaming video image.

At step 1110, user device 102 can receive images from proximate devices. For example, group selfie application 108 can receive individual selfies captured by the contributor devices. The individual selfies can be still images, stored video images, or live streaming video images.

At step 1112, user device 102 can generate a synthetic group selfie using the captured originating user's individual selfie and the individual selfies received from the contributor devices. For example, group selfie application 108 can automatically arrange the individual selfies (e.g., originator and contributor selfies) into a synthetic group selfie. The synthetic group selfie can be presented (e.g., previewed) on a display of user device 102.

At step 1114, user device 102 can store the synthetic group selfie as a multi-resource object. For example, group selfie application 108 can receive user input indicating that the originating user wishes to store or save the synthetic group selfie. In response to the user input, group selfie application 108 can stored the synthetic group selfie as a multi-resource object that includes the individual selfies, a background image, and configuration data that defines the layout of individual selfies in the synthetic group selfie.

At step 1116, user device 102 can send the synthetic group selfie to another computing device. For example, user device 102 can receive input from the originating user to send the synthetic group selfie to another device. If the other device is configured to process the multi-resource object corresponding to the synthetic group selfie, user device 102 can send the multi-resource object to the other device. For example, if the other device includes a group selfie application (e.g., group selfie application 108), then the other device may be able to process the multi-resource object corresponding to (e.g. comprising) the synthetic group selfie. If the other device is not configured to process the multi-resource object, user device 102 can flatten the multi-resource object into a single image that can be sent to and processed by the other device.

Figure 12:
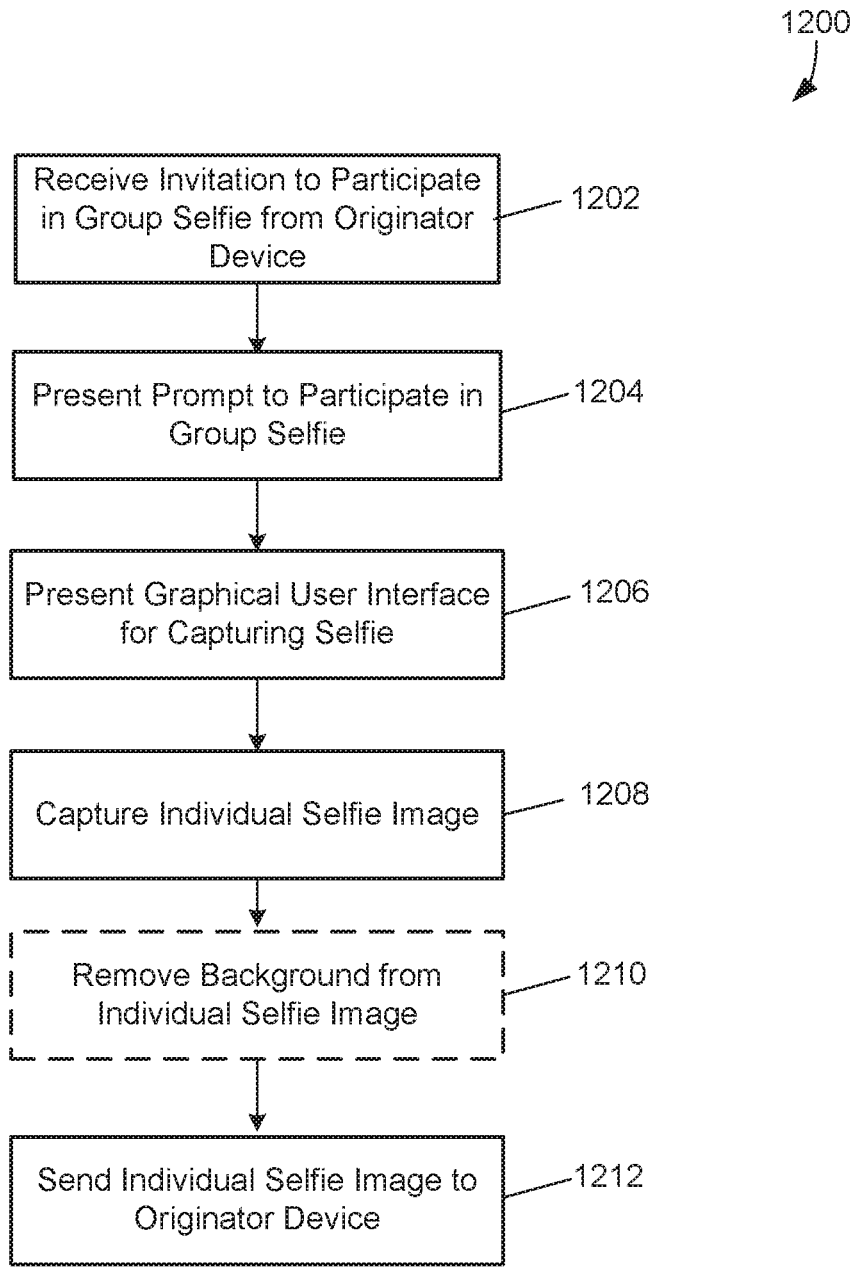
FIG. 12 is a flow diagram of an example process for participating in a synthetic group selfie at a contributor device.

FIG. 12 is a flow diagram of an example process 1200 for participating in a synthetic group selfie at a contributor device. For example, process 1200 can be performed by a contributor device (e.g., contributor device 120, 130, and/or 140) to provide an individual selfie to an originator device (e.g., user device 102) for inclusion in a synthetic group selfie.

At step 1202, contributor device 120 can receive an invitation to participate in a synthetic group selfie. The invitation can be received from an originator device (e.g., user device 102). The invitation can identify the type of image to capture and/or include identifiers for other people who will participate in or contribute to the synthetic group selfie.

At step 1204, contributor device 120 can present a prompt to participate in the synthetic group selfie. For example, contributor device 120 can present a notification on a display of contributor device 120 indicating that the contributor user has been invited to participate in a synthetic group selfie. The notification can identify the originating user and provide selectable graphical elements to accept or decline the invitation, as illustrated by FIG. 4.

At step 1206, contributor device 120 can present a graphical user interface for capturing an individual selfie of the contributing user. For example, when the contributing user accepts the invitation by providing input to the notification at step 1204, contributor device 120 can invoke the local group selfie application on contributor device 120. Contributor device 120 can provide the image type information from the invitation to the group selfie application so that the group selfie application can be automatically configured to capture the specified type of image when capturing the individual selfie of the contributing user.

At step 1208, contributor device 120 can capture the individual selfie of the contributing user. For example, the contributing user can provide input the a graphical user interface of the group selfie application to cause the group selfie application to capture an individual selfie conforming to the specified image type.

Optionally, at step 1210, contributor device 120 can remove the background portion of the individual selfie image. For example, the group selfie application can process the individual selfie image to remove the background portion of the individual selfie image before sending the individual selfie image to originating user device 102. Thus, in some implementations, the individual selfie sent to user device 102 may only include pixels corresponding to the image of the contributing user (e.g., the foreground portion of the image). In some implementations, however, the entire individual selfie (e.g., foreground and background portions of the image) can be sent to user device 102. User device 102 can then process the individual selfie image to remove the background portion of the image so that only the portion of the image corresponding to the contributing user's likeness remains in the individual selfie.

At step 1212, contributor device 120 can send the individual selfie image to originator user device 102. For example, the group selfie application on contributor device 120 can send the individual selfie captured by contributor device 120 to group selfie application 108 on user device 102 for inclusion in the synthetic group selfie generated by group selfie application 108.

Figure 13:
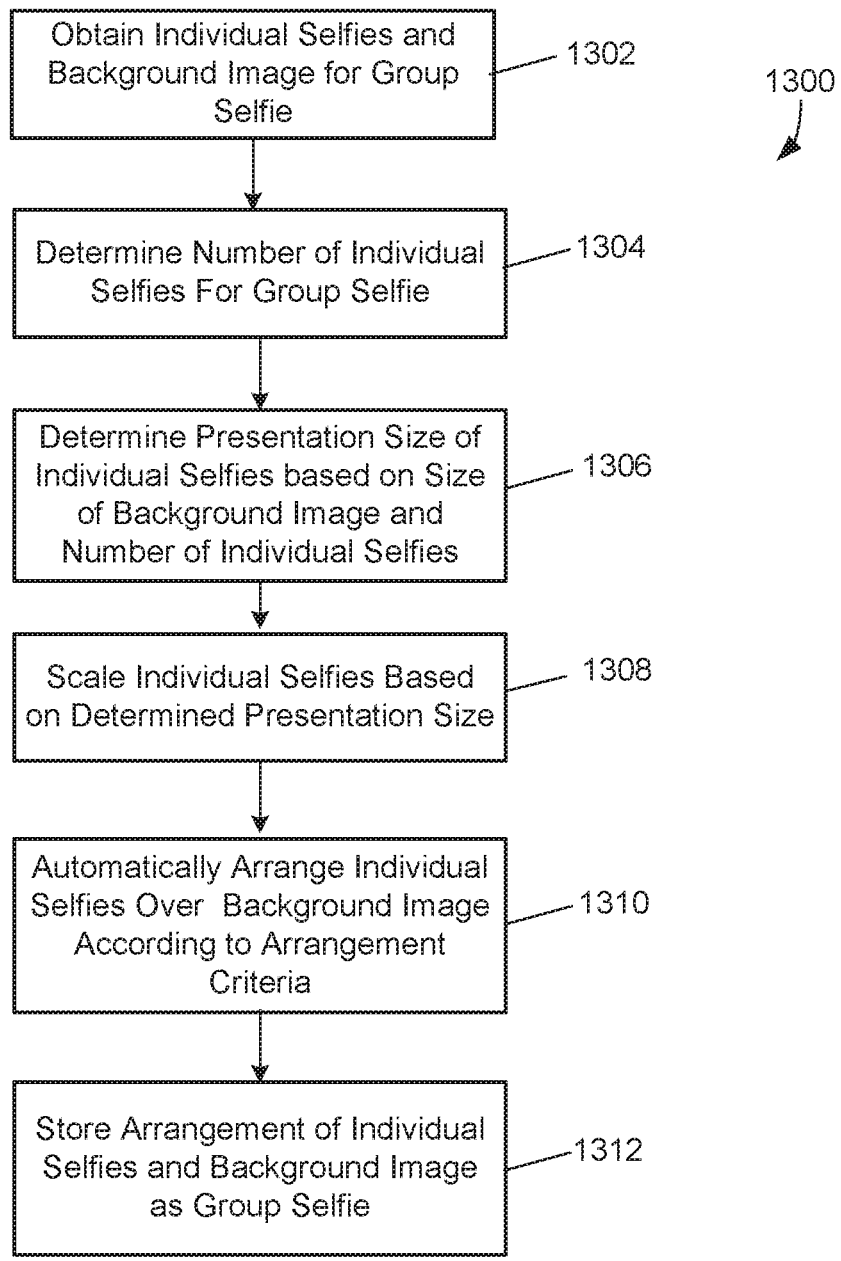
FIG. 13 is a flow diagram of an example process for automatically arranging individual selfies into a synthetic group selfie.

FIG. 13 is a flow diagram of an example process 1300 for automatically arranging individual selfies into a synthetic group selfie. For example, process 1300 can be performed by user device 102. Process 1300 can be performed at step 1112 of process 1100 described above.

At step 1302, user device 102 can obtain individual selfies and a background image for a synthetic group selfie. For example, group selfie application 108 can receive the individual selfies from contributor user devices (e.g., contributor devices 120, 130, 140, etc.) and/or generated the originator's individual selfie. The background image can be obtained from an individual selfie (e.g., the background portion of the originator user's individual selfie). The background image can be obtained from media database 110 in response to the user selecting an image in media database 110.

At step 1304, user device 102 can determine the number of individual selfie to include in the synthetic group selfie. For example, the number of individual selfies can correspond to the number of contributing users plus the originating user.

At step 1306, user device 102 can determine the presentation size of the individual selfies based on the size of the background image and the number of individual selfies. For example, group selfie application 108 can divide the horizontal length of the background image by the number of individual selfies to calculate the horizontal length of each individual selfie image. group selfie application 108 can then allocate space to each individual selfie based on the horizontal length allocated to each individual selfie. If the calculated horizontal length is less than a threshold value (e.g., the individual selfies become too small), then two rows of individual selfies can be presented over the background image. The horizontal length of the individual selfies in each row can be calculated by dividing the horizontal length of the background image by half of the number of individual selfies. Alternatively, group selfie application 108 can calculate a presentation size for each individual group selfie that ensures that there is no more than a threshold amount of overlap (e.g., no more than 20%) between each individual selfie. This threshold amount of overlap can be adjusted such that the key features (e.g., eyes, nose, mouth, etc.) of a person's face in the resultant synthetic group selfie are not obscured.

At step 1306, user device 102 can scale the individual selfies based on the determined presentation size. For example, group selfie application 108 can scale the individual selfies so that they are about the same size as other individual selfies in the synthetic group selfie and so that can fit within the determined presentation size, as described above.

At step 1308, user device 102 can automatically arrange individual selfies over the background image according to some arrangement criteria. For example, group selfie application 108 can arrange individual selfies in the synthetic group selfie based on the relationships between the contributing users and the originating user, as described above. Other criteria, such as proximity of the contributing users to the originating user, time of receipt of the individual selfies, etc., can be used to determine how to arrange individual selfies in the synthetic group selfie.

At step 1310, user device 102 can store the arrangement of individual selfies and background image as a synthetic group selfie. For example, group selfie application 108 can store the synthetic group selfie as a multi-resource object that includes the individual selfies, the background image, and/or image layout configuration data, as described above.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 14:
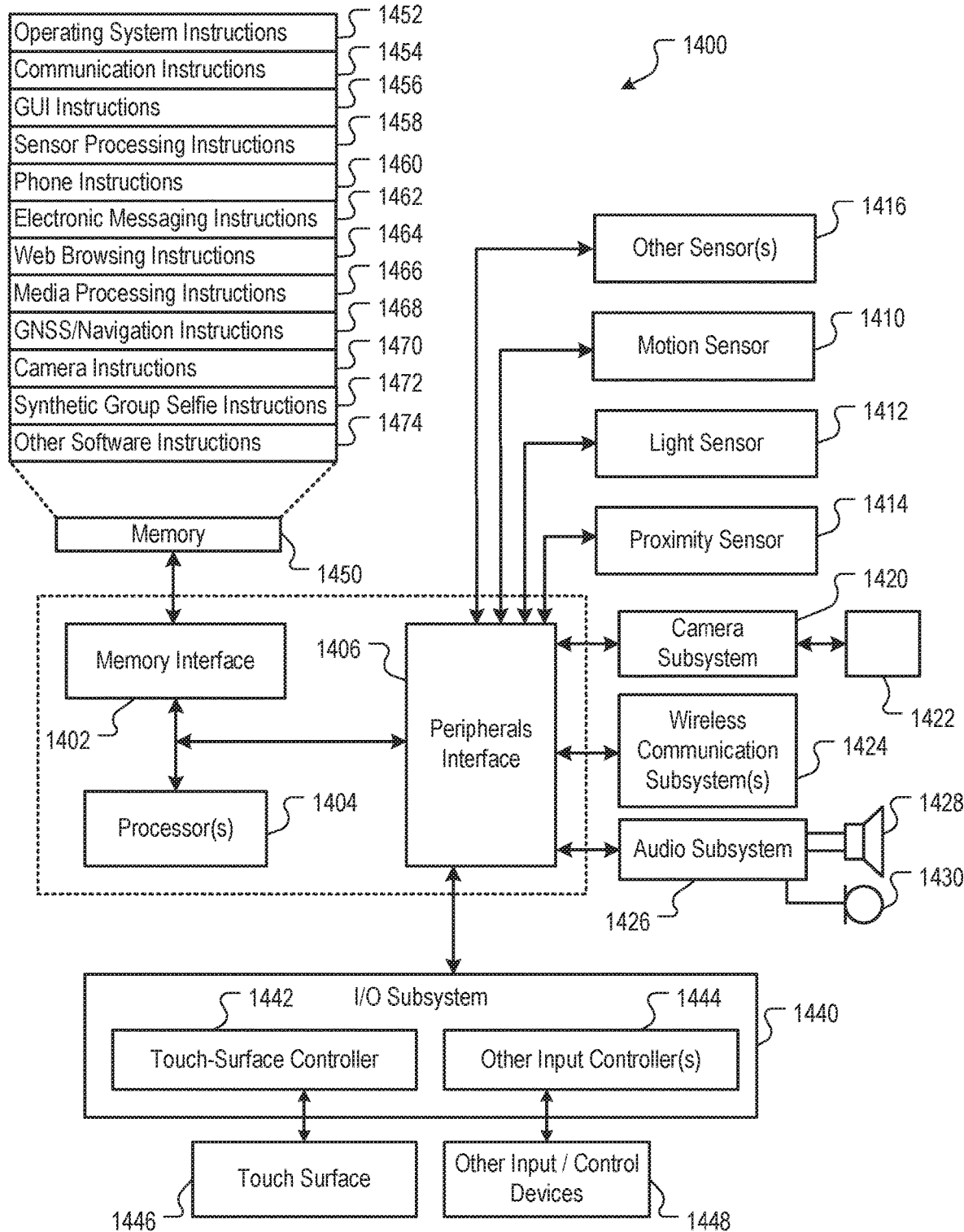
FIG. 14 is a block diagram of an example computing device that can implement the features and processes of FIGS. 1-13.

FIG. 14 is a block diagram of an example computing device 1400 that can implement the features and processes of FIGS. 1-13. The computing device 1400 can include a memory interface 1402, one or more data processors, image processors and/or central processing units 1404, and a peripherals interface 1406. The memory interface 1402, the one or more processors 1404 and/or the peripherals interface 1406 can be separate components or can be integrated in one or more integrated circuits. The various components in the computing device 1400 can be coupled by one or more communication buses or signal lines.

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate orientation, lighting, and proximity functions. Other sensors 1416 can also be connected to the peripherals interface 1406, such as a global navigation satellite system (GNSS) (e.g., GPS receiver), a temperature sensor, a biometric sensor, magnetometer or other sensing device, to facilitate related functionalities.

A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips. The camera subsystem 1420 and the optical sensor 1422 can be used to collect images of a user to be used during authentication of a user, e.g., by performing facial recognition analysis.

Communication functions can be facilitated through one or more wireless communication subsystems 1424, which can include radio frequency receivers and transmitters and/or optical (e.g., infrared) receivers and transmitters. The specific design and implementation of the communication subsystem 1424 can depend on the communication network(s) over which the computing device 1400 is intended to operate. For example, the computing device 1400 can include communication subsystems 1424 designed to operate over a GSM network, a GPRS network, an EDGE network, a Wi-Fi or WiMax network, and a Bluetooth™ network. In particular, the wireless communication subsystems 1424 can include hosting protocols such that the device 100 can be configured as a base station for other wireless devices.

An audio subsystem 1426 can be coupled to a speaker 1428 and a microphone 1430 to facilitate voice-enabled functions, such as speaker recognition, voice replication, digital recording, and telephony functions. The audio subsystem 1426 can be configured to facilitate processing voice commands, voiceprinting and voice authentication, for example.

The I/O subsystem 1440 can include a touch-surface controller 1442 and/or other input controller(s) 1444. The touch-surface controller 1442 can be coupled to a touch surface 1446. The touch surface 1446 and touch-surface controller 1442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1446.

The other input controller(s) 1444 can be coupled to other input/control devices 1448, such as one or more buttons, rocker switches, thumb-wheel, infrared port, USB port, and/or a pointer device such as a stylus. The one or more buttons (not shown) can include an up/down button for volume control of the speaker 1428 and/or the microphone 1430.

In one implementation, a pressing of the button for a first duration can disengage a lock of the touch surface 1446; and a pressing of the button for a second duration that is longer than the first duration can turn power to the computing device 1400 on or off. Pressing the button for a third duration can activate a voice control, or voice command, module that enables the user to speak commands into the microphone 1430 to cause the device to execute the spoken command. The user can customize a functionality of one or more of the buttons. The touch surface 1446 can, for example, also be used to implement virtual or soft buttons and/or a keyboard.

In some implementations, the computing device 1400 can present recorded audio and/or video files, such as MP3, AAC, and MPEG files. In some implementations, the computing device 1400 can include the functionality of an MP3 player, such as an iPod™. The computing device 1400 can, therefore, include a 36-pin connector that is compatible with the iPod. Other input/output and control devices can also be used.

The memory interface 1402 can be coupled to memory 1450. The memory 1450 can include high-speed random access memory and/or non-volatile memory, such as one or more magnetic disk storage devices, one or more optical storage devices, and/or flash memory (e.g., NAND, NOR). The memory 1450 can store an operating system 1452, such as Darwin, RTXC, LINUX, UNIX, OS X, WINDOWS, or an embedded operating system such as VxWorks.

The operating system 1452 can include instructions for handling basic system services and for performing hardware dependent tasks. In some implementations, the operating system 1452 can be a kernel (e.g., UNIX kernel). In some implementations, the operating system 1452 can include instructions for performing voice authentication. For example, operating system 1452 can implement the synthetic group selfie features as described with reference to FIGS. 1-13.

The memory 1450 can also store communication instructions 1454 to facilitate communicating with one or more additional devices, one or more computers and/or one or more servers. The memory 1450 can include graphical user interface instructions 1456 to facilitate graphic user interface processing; sensor processing instructions 1458 to facilitate sensor-related processing and functions; phone instructions 1460 to facilitate phone-related processes and functions; electronic messaging instructions 1462 to facilitate electronic-messaging related processes and functions; web browsing instructions 1464 to facilitate web browsing-related processes and functions; media processing instructions 1466 to facilitate media processing-related processes and functions; GNSS/Navigation instructions 1468 to facilitate GNSS and navigation-related processes and instructions; and/or camera instructions 1470 to facilitate camera-related processes and functions.

The memory 1450 can store other software instructions 1472 to facilitate other processes and functions, such as the synthetic group selfie processes and functions as described with reference to FIGS. 1-13.

The memory 1450 can also store other software instructions 1474, such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions of the computing device 1400 can be implemented in hardware and/or in software, including in one or more signal processing and/or application specific integrated circuits.

What is claimed is:
1. A method comprising:
   receiving, by an originator computing device including a forward facing image capture device, input selecting a group self-image capture mode of the originator computing device;
   in response to receiving the input, determining, by the originator computing device, one or more contributor computing devices proximate to the originator computing device;
   sending, by the originator computing device, an invitation to the one or more contributor computing devices, the invitation inviting the one or more contributor computing devices to participate in a group self-image;
   capturing, by the originator computing device, an originator image media item;
   receiving, by the originator computing device, at least one contributor image media item from at least one of the contributor computing devices;

generating, by the originator computing device, a composite group self-image using the originator image media item and the at least one contributor image media item; and presenting, by the originator computing device, the composite group self-image on a display of the originator computing device.

2. The method of claim 1, wherein the image capture device is positioned within arm's length to an user whose image is captured by the image capture device.

3. The method of claim 1, wherein determining one or more contributor computing devices proximate to the originator computing device comprises:

determining that the one or more contributor computing devices are within a threshold distance of the originator computing device.

4. The method of claim 1, wherein the at least one contributor image media item includes a background portion and a foreground portion, and wherein receiving, by the originator computing device, at least one contributor image media item from at least one of the contributor computing devices comprises receiving only the foreground portion from the at least one contributor computing device by the originator computing device.

5. The method of claim 1, wherein generating a composite group self-image using the originator image media item and the at least one contributor image media item includes automatically arranging the originator image media item and the at least one contributor image media item in the composite group self-image.

6. The method of claim 1, further comprising:

storing, by the originator computing device, the composite group self-image as a multi-resource object, including the originator image media item, the at least one contributor image media item, a background image media item, and composition data defining how to arrange the originator image media item, the at least one contributor image media item, and the background image media item in the composite group self-image.

7. The method of claim 6, further comprising:

generating, by the originator computing device, a single resource object based on the multi-resource object; and sending, by the originator computing device, the single resource object to at least one other computing device.

8. The method of claim 1, wherein the originator image media item corresponds to a still image, a recorded video, or a live video feed.

9. A non-transitory computer readable medium including one or more sequences of instructions that, when executed by one or more processors, cause the processors to perform operations comprising:

receiving, by an originator computing device including a forward facing image capture device, input selecting a group self-image capture mode of the originator computing device;

in response to receiving the input, determining, by the originator computing device, one or more contributor computing devices proximate to the originator computing device;

sending, by the originator computing device, an invitation to the one or more contributor computing devices, the invitation inviting the one or more contributor computing devices to participate in a group self-image;

capturing, by the originator computing device, an originator image media item;

receiving, by the originator computing device, at least one contributor image media item from at least one of the contributor computing devices;

generating, by the originator computing device, a composite group self-image using the originator image media item and the at least one contributor image media item; and presenting, by the originator computing device, the composite group self-image on a display of the originator computing device.

10. The non-transitory computer readable medium of claim 9, wherein the image capture device is positioned within arm's length to an user whose image is captured by the image capture device.

11. The non-transitory computer readable medium of claim 9, wherein the instructions that cause determining one or more contributor computing devices proximate to the originator computing device include instructions that cause:

determining that the one or more contributor computing devices are within a threshold distance of the originator computing device.

12. The non-transitory computer readable medium of claim 9, wherein the at least one contributor image media item includes a background portion and a foreground portion, and wherein the instructions that cause receiving, by the originator computing device, at least one contributor image media item from at least one of the contributor computing devices include instructions that cause receiving only the foreground portion from the at least one contributor computing device by the originator computing device.

13. The non-transitory computer readable medium of claim 9, wherein the instructions that cause generating a composite group self-image using the originator image media item and the at least one contributor image media item include instructions that cause automatically arranging the originator image media item and the at least one contributor image media item in the composite group self-image.

14. The non-transitory computer readable medium of claim 9, wherein the instructions cause:

storing, by the originator computing device, the composite group self-image as a multi-resource object, including the originator image media item, the at least one contributor image media item, a background image media item, and composition data defining how to arrange the originator image media item, the at least one contributor image media item and the background image media item in the composite group self-image.

15. The non-transitory computer readable medium of claim 14, wherein the instructions cause:

generating, by the originator computing device, a single resource object based on the multi-resource object; and sending, by the originator computing device, the single resource object to at least one other computing device.

16. The non-transitory computer readable medium of claim 9, wherein the originator image media item corresponds to a recorded video or a live video feed.

17. A system comprising:

one or more processors; and a non-transitory computer readable medium including one or more sequences of instructions that, when executed by one or more processors, cause the processors to perform operations comprising:

receiving, by an originator computing device including a forward facing image capture device, input selecting a group self-image capture mode of the originator computing device;

in response to receiving the input, determining, by the originator computing device, one or more contributor computing devices proximate to the originator computing device;

sending, by the originator computing device, an invitation to the one or more contributor computing devices, the invitation inviting the one or more contributor computing devices to participate in a group self-image;

capturing, by the originator computing device, an originator image media item;

receiving, by the originator computing device, at least one contributor image media item from at least one of the contributor computing devices;

generating, by the originator computing device, a composite group self-image using the originator image media item and the at least one contributor image media item; and presenting, by the originator computing device, the composite group self-image on a display of the originator computing device.

18. The system of claim 17, wherein the image capture device is positioned within arm's length to an user whose image is captured by the image capture device.

19. The system of claim 17, wherein the instructions that cause determining one or more contributor computing devices proximate to the originator computing device include instructions that cause:

determining that the one or more contributor computing devices are within a threshold distance of the originator computing device.

20. The system of claim 17, wherein the at least one contributor image media item includes a background portion and a foreground portion, and wherein the instructions that cause receiving, by the originator computing device, at least one contributor image media item from at least one of the contributor computing devices include instructions that cause receiving only the foreground portion from the at least one contributor computing device by the originator computing device.

21. The system of claim 17, wherein the instructions that cause generating a composite group self-image using the originator image media item and the at least one contributor image media item include instructions that cause automatically arranging the originator image media item and the at least one contributor image media item in the composite group self-image.

22. The system of claim 17, wherein the instructions cause:

storing, by the originator computing device, the composite group self-image as a multi-resource object, including the originator image media item, the at least one contributor image media item, a background image media item, and composition data defining how to arrange the originator image media item, the at least one contributor image media item and the background image media item in the composite group self-image.

23. The system of claim 22, wherein the instructions cause:

generating, by the originator computing device, a single resource object based on the multi-resource object; and sending, by the originator computing device, the single resource object to at least one other computing device.

24. The system of claim 17, wherein the originator image media item corresponds to a still image, a recorded video, or a live video feed.

* * * * *